United States Patent
Fukushi et al.

(12)

(10) Patent No.: US 12,505,701 B2
(45) Date of Patent: Dec. 23, 2025

(54) TRAINING DEVICE, DATA EXTENSION SYSTEM, ESTIMATION DEVICE, TRAINING METHOD, AND RECORDING MEDIUM

(71) Applicant: NEC Corporation, Tokyo (JP)

(72) Inventors: Kenichiro Fukushi, Tokyo (JP); Yoshitaka Nozaki, Tokyo (JP); Kosuke Nishihara, Tokyo (JP); Kentaro Nakahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 18/379,361

(22) Filed: Oct. 12, 2023

(65) Prior Publication Data

US 2024/0153313 A1 May 9, 2024

(30) Foreign Application Priority Data

Oct. 28, 2022 (JP) ................. 2022-172999

(51) Int. Cl.
*G06V 40/20* (2022.01)
*G06V 10/82* (2022.01)

(52) U.S. Cl.
CPC .............. *G06V 40/23* (2022.01); *G06V 10/82* (2022.01)

(58) Field of Classification Search
CPC .................. G06V 40/23; G06V 10/82
See application file for complete search history.

(56) References Cited

PUBLICATIONS

Li Niu et al., "Hallucinating uncertain motion and future for static image action recognition", Dec. 18, 2021, Computer Vision and Image Understanding 215 (10 pages) (Year: 2021).*
Degardin et al., "Generative Adversarial Graph Convolutional Networks for Human Action Synthesis", 2021, arXiv:2110.11191v3 (12 pages) (Year: 2021).*
B. Degardin et al., "Generative Adversarial Graph Convolutional Networks for Human Action Synthesis", In Proc. WACV, 2022, pp. 1150-1159.
U. Ojha et al., "Few-shot Image Generation via Cross-domain Correspondence", In Proc. CVPR, 2021, pp. 10743-10752.

* cited by examiner

*Primary Examiner* — David F Dunphy

(57) ABSTRACT

A training device including a motion data acquisition unit that acquires first motion data related to a target motion, a first generation unit that generates pseudo first motion data by using a first generation model, a determination unit that calculates a determination loss indicating a degree of deviation between the first motion data and the pseudo first motion data using a determination model, a relevance calculation unit that reconfigures the target motion by a combination of basis motions and calculate a degree of relevance between the target motion and the basis motions, a regularization loss calculation unit that calculates a regularization loss indicating a degree of deviation between motion data related to the basis motions and the pseudo first motion data, and an adversarial training processing unit that adversarially trains the first generation model and the determination model using the determination loss and the regularization loss.

10 Claims, 16 Drawing Sheets

TRAINING DEVICE, DATA EXTENSION SYSTEM, ESTIMATION DEVICE, TRAINING METHOD, AND RECORDING MEDIUM

This application is based upon and claims the benefit of priority from Japanese Patent Application No. 2022-172999, filed on Oct. 28, 2022, the disclosure of which is incorporated herein in its entirety by reference.

TECHNICAL FIELD

The present example disclosure relates to a training device and the like used for training a model that extends motion data.

BACKGROUND ART

There is an increasing need for a technology for sensing and recognizing a motion or an action of a person with a video, motion capture, or a wearable sensor. For example, by using a recognition model that is trained with motion data by a method such as machine training, a motion or an action of a person can be recognized. In order to perform recognition with more practical accuracy, it is necessary to measure motions of various persons in such a way that variations regarding a physique, an age, a motion habit for each individual, and the like are included in training data, and to train a recognition model using a large amount of motion data. Since it takes a lot of time and effort to measure the motion data, pseudo motion data that is pseudo data of the motion data actually measured is used. Therefore, there is a demand for a data extension technique for extending motion data to generate a large amount of pseudo motion data.

Non-Patent Literature 1 (B. Degardin, et al., "Generative Adversarial Graph Convolutional Networks for Human Action Synthesis," In Proc. WACV, 2022.) discloses a technique called Kinetic-GAN (Generative Adversarial Network). Kinetic-GAN is an architecture that synthesizes motion characteristics of a human body by utilizing GAN and ST-GCN (Spatial Temporal Graph Convolutional Network). In Kinetic-GAN, a model (motion generation model) that generates pseudo motion data is trained by adversarial training. In Non Patent Literature 1, Wasserstein-GAN is used as a loss function of training a motion generation model. For example, using the method of Non-Patent Literature 1, it is possible to generate pseudo data of up to 120 types of motions by training a motion generation model with a public data set of daily motions.

Non-Patent Literature 2 (U. Ojha, et al., "Few-shot Image Generation via Cross-domain Correspondence," In Proc. CVPR, 2021.) discloses a technique called cross-domain training. In the cross-domain training of Non-Patent Literature 2, an image generation model is trained using a large amount of source data in a source domain and a small amount of target data in a target domain. As the source data, an easily available public data set is used. The actual data is used as the target data. In the method of Non-Patent Literature 2, the probability distribution representing the diversity among samples in the source domain is also applied to the target domain, and the diversity can be secured even with a small amount of actual data. Therefore, according to the method of Non-Patent Literature 2, the image generation model can be trained using a small amount of actual data without causing over-training.

When the motion generation model of Non-Patent Literature 1 can be trained using the cross-domain training method disclosed in Non-Patent Literature 2, the motion generation model can be trained without over-training even with a small amount of motion data. However, the technology of Non-Patent Literature 2 does not support Conditional-GAN. Therefore, it is difficult to train the motion generation model of Non-Patent Literature 1 using the cross-domain training method.

An object of the present example disclosure is to provide a training device and the like capable of training a motion generation model without causing over-training even with a small amount of motion data.

SUMMARY

A training device according to an aspect of the present example disclosure includes a motion data acquisition unit that acquires first motion data related to a target motion, a first generation unit including a first generation model that outputs pseudo first motion data in response to an input of the first motion data, a determination unit that calculates a determination loss indicating a degree of deviation between the first motion data and the pseudo first motion data with respect to the acquired first motion data and the generated pseudo first motion data using a determination model for determining whether input motion data is the first motion data or the pseudo first motion data, a relevance calculation unit that reconfigures the target motion by a combination of at least one basis motion and calculate a degree of relevance between the target motion and the basis motion, a regularization loss calculation unit that calculates a regularization loss indicating a degree of deviation between motion data related to the at least one basis motion and the pseudo first motion data, and an adversarial training processing unit that adversarially trains the first generation model and the determination model using the determination loss and the regularization loss.

A training method according to an aspect of the present example disclosure includes acquiring first motion data related to a target motion, generating a pseudo first motion using a first generation model that outputs pseudo first motion data in response to an input of the first motion data, calculating a determination loss indicating a degree of deviation between the first motion data and the pseudo first motion data with respect to the acquired first motion data and the generated pseudo first motion data using a determination model for determining whether input motion data is the first motion data or the pseudo first motion data, reconfiguring the target motion by a combination of at least one basis motion, calculating a degree of relevance between the target motion and the basis motion, calculating a regularization loss indicating a degree of deviation between motion data related to the at least one basis motion and the pseudo first motion data, and adversarially training the first generation model and the determination model using the determination loss and the regularization loss.

A program according to an aspect of the present example disclosure cause a computer to execute acquiring first motion data related to a target motion, generating a pseudo first motion using a first generation model that outputs pseudo first motion data in response to an input of the first motion data, calculating a determination loss indicating a degree of deviation between the first motion data and the pseudo first motion data with respect to the acquired first motion data and the generated pseudo first motion data using a determination model for determining whether input motion data is the first motion data or the pseudo first motion data, reconfiguring the target motion by a combination of at least one basis motion, calculating a degree of relevance between the target motion and the basis motion, calculating a regularization loss indicating a degree of deviation between motion data related to the at least one basis motion and the pseudo first motion data, and adversarially training the first generation model and the determination model using the determination loss and the regularization loss.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
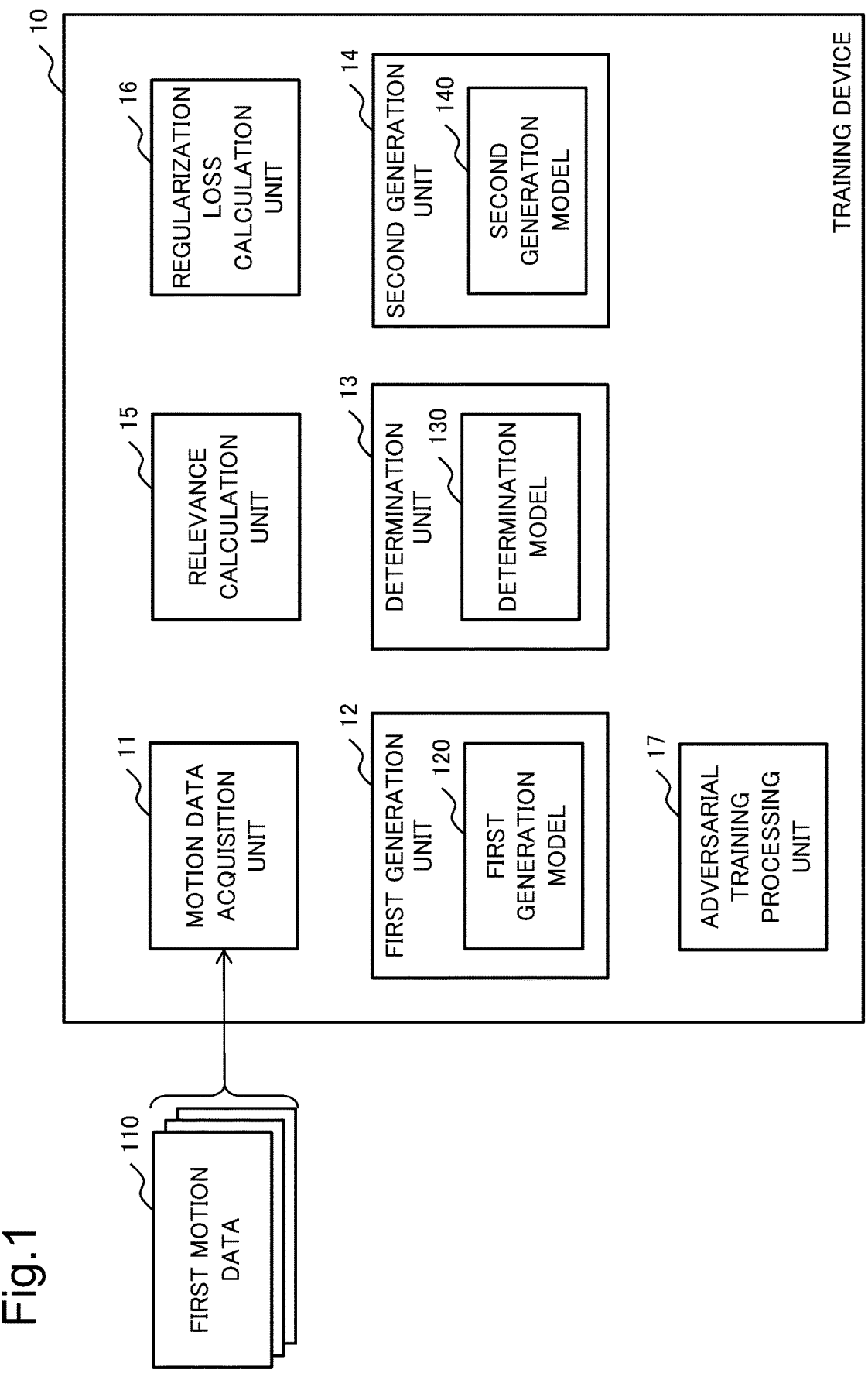
FIG. 1 is a block diagram illustrating an example of a configuration of a training device according to a first example embodiment.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a training device according to a first example embodiment will be described with reference to the drawings. The training device of the present example embodiment trains a model (motion generation model) that generates a motion of actual data given as first motion data by adversarial training. The motion data is data indicating a change in posture according to the motion of the person. The motion data is extracted from a plurality of frames constituting the moving image. Data regarding the posture of the person extracted from each frame is also referred to as posture data. That is, the motion data is data in which a plurality of pieces of posture data is connected in time series. Hereinafter, the motion data and the posture data are referred to as motion data without distinction.

The present example embodiment includes portions described based on the method disclosed in Non-Patent Literatures 1 to 2 (Non-Patent Literature 1: B. Degardin, et al., "Generative Adversarial Graph Convolutional Networks for Human Action Synthesis," In Proc. WACV, 2022, Non-Patent Literature 2: U. Ojha, et al., "Few-shot Image Generation via Cross-domain Correspondence," In Proc. CVPR, 2021).

(Configuration)

FIG. 1 is a block diagram illustrating an example of a configuration of a training device 10 according to the present example embodiment. The training device 10 includes a motion data acquisition unit 11, a first generation unit 12, a determination unit 13, a second generation unit 14, a relevance calculation unit 15, a regularization loss calculation unit 16, and an adversarial training processing unit 17. In FIG. 1, lines indicating connections between components are omitted. The training device of the present example embodiment performs cross-domain training using a large amount of source data included in a source domain and a small amount of target data included in a target domain.

The motion data acquisition unit 11 acquires first motion data 110. The first motion data 110 is data of the target domain (target motion data). The first motion data 110 is motion data extracted from the motion of the subject actually measured. For example, the first motion data 110 is data obtained by actually measuring a specific motion (target motion) performed by a small number of subjects of about 10 persons by motion capture or the like. The first motion data 110 is required to be actually measured. Therefore, it is difficult to prepare a large amount of first motion data 110. For example, the target motion includes motions such as backlash, jumping, gait, running, and stretching. The type of the target motion is not particularly limited as long as it can be reconfigured using source motion data (second motion data) to be described later.

Figure 2:
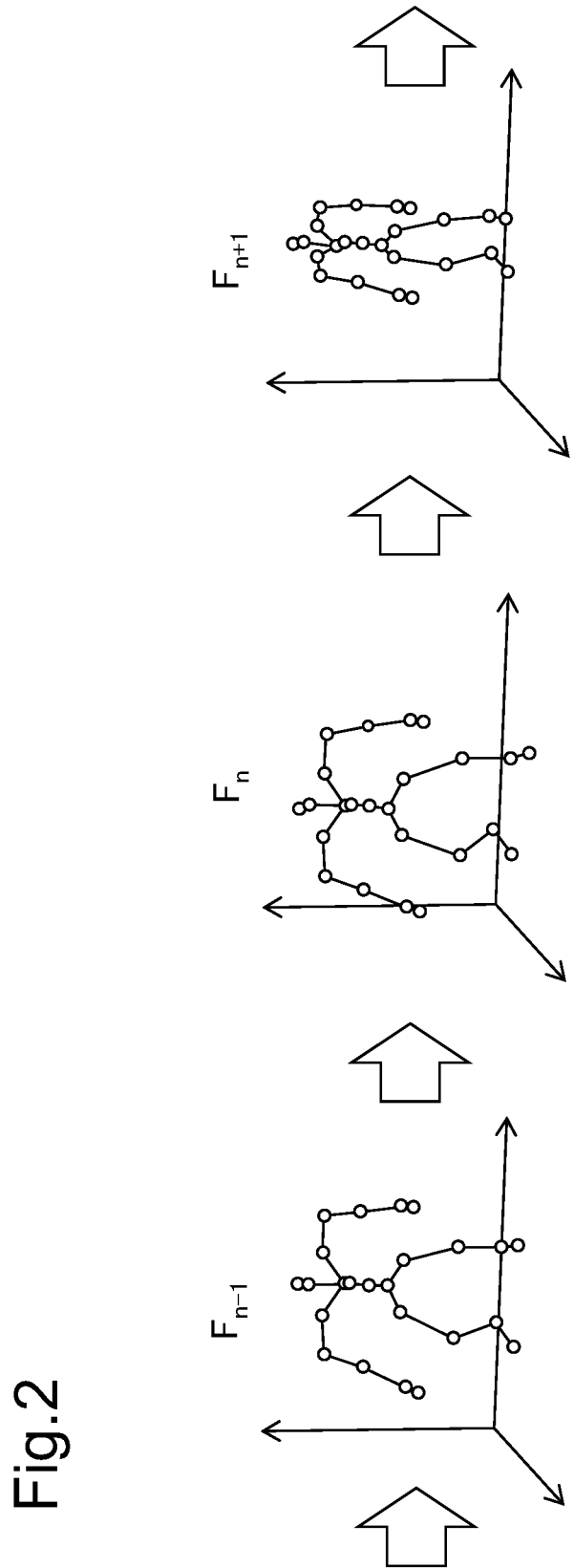
FIG. 2 is a conceptual diagram for describing a target motion according to the first example embodiment.

FIG. 2 is a conceptual diagram for describing an example of a target motion. FIG. 2 is a diagram obtained by cutting out some of consecutive frames included in a moving image showing a motion of a person who performs a target motion. FIG. 2 illustrates target motions extracted from the frame $F_{n-1}$, the frame $F_n$, and the frame $F_{n+-1}$ included in the moving image (n is a natural number). The frame $F_{n-1}$, the frame $F_n$, and the frame $F_{n+1}$ are continuous frames. In each frame, circles indicating positions of representative parts of the person are connected by connection lines. For example, joints such as a shoulder, an elbow, a wrist, a neck, a chest, a waist, a crotch, a knee, and an ankle are selected as representative parts of the person. For example, ends such as a head, a fingertip, and a toe are selected as representative parts of the person. Parts between joints and ends may be selected as representative parts of a person. Hereinafter, the position of a representative part of a person is expressed as a joint.

Figure 3:
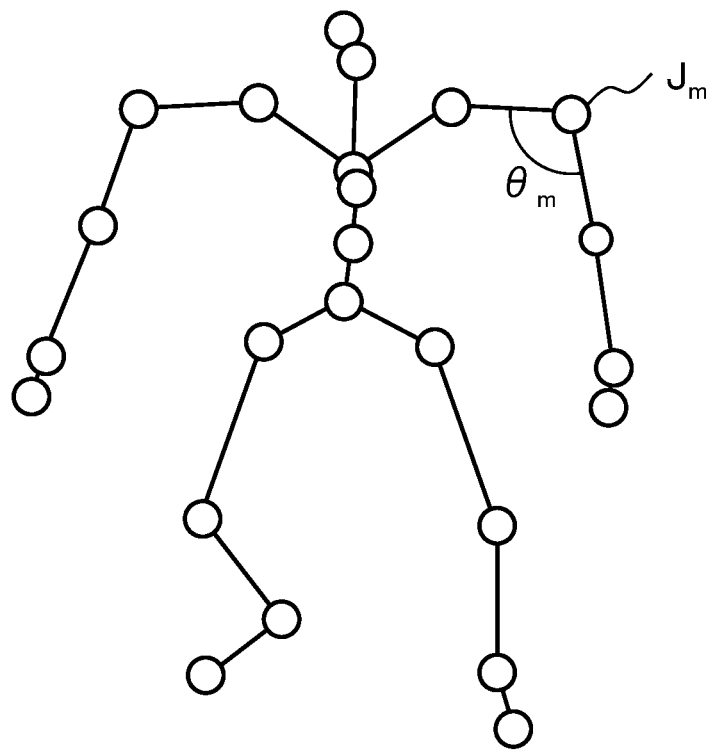
FIG. 3 is a conceptual diagram for describing an example of first motion data acquired by the training device according to the first example embodiment.

FIG. 3 is a conceptual diagram for describing an example of the first motion data 110 (target motion data). In the present example embodiment, a three-dimensional joint angle (Euler angle $\theta_m$) formed by two connection lines connected by the joint $J_m$ is used as the first motion data. The first motion data 110 is a data set in which angles formed by two connection lines connected to a plurality of joints are collected. The data used as the first motion data 110 is not particularly limited as long as it can be used for estimation of the target motion.

The first generation unit 12 includes a first generation model 120. In the present example embodiment, the first generation model 120 is a target to be trained by the training device 10. The first generation model 120 is a model (target motion generation model) that generates pseudo data (pseudo first motion data) of the first motion data 110. The first generation model 120 outputs the pseudo first motion data in response to the input of the first motion data 110. The first generation unit 12 generates pseudo first motion data using the first generation model 120. Hereinafter, the first generation model 120 is expressed as $G_{s \to t}(z)$. z is noise (noise vector) added in the generation of the pseudo first motion data. For example, in the generation of the pseudo first motion data, noise according to a normal distribution is applied.

The determination unit 13 includes a determination model 130. In the present example embodiment, the determination model 130 is not a target to be trained by the training device 10, but is secondarily trained. The determination model 130 is a model for determining whether the input motion data is the first motion data 110 or the pseudo first motion data. The determination unit 13 acquires the first motion data 110 and the first pseudo data as the motion data. The determination unit 13 determines whether the acquired motion data is the first motion data 110 or the first pseudo data using the determination model 130. The determination unit 13 outputs a determination loss related to the acquired first motion data 110 and first pseudo data according to the determination model determination result.

For example, the determination unit 13 calculates an index value (determination loss) indicating how much the acquired motion data (prediction value) deviates from the first motion data 110 (correct value). For example, the determination loss is a value calculated using a general adversarial loss disclosed in Non-Patent Literature 2 (Expression 1).

$$L_{adv} = D(G(z)) - D(x) \quad (1)$$

In Expression 1 above, D(x) represents the determination model 130. G(z) represents a second generation model 140 to be described later. The determination unit 13 may calculate the determination loss using a method that is not the adversarial loss disclosed in Non-Patent Literature 2. For example, the determination unit 13 may calculate the determination loss using Wasserstein Loss disclosed in Non-Patent Literature 1.

The second generation unit 14 includes the second generation model 140. In the present example embodiment, the second generation model 140 is a trained model and is not a target to be trained by the training device 10. The second generation model 140 is a model that generates pseudo data (pseudo second motion data) of the second motion data. The second motion data is data of the source domain (source motion data). The second motion data is motion data extracted from the versatile data. For example, the second motion data is extracted from the public data set. The second motion data is easily obtained and can be prepared in a large amount. The second generation model 140 outputs the pseudo second motion data in response to the input of the second motion data. The second generation unit 14 generates pseudo second motion data using the second generation model 140.

The second generation unit 14 switches the source motion number and generates pseudo second motion data using the second motion data related to the source motion number. For example, the second generation model 140 generates the pseudo second motion data using the second generation model 140 by the method of Conditional GAN (Generative Adversarial Network) disclosed in Non-Patent Literature 1. The second generation unit 14 may use a plurality of generation models related to a single motion without using Conditional GAN method. In this case, the second generation unit 14 switches the generation model itself instead of generating the pseudo second motion data by switching the source motion number.

For example, the first generation model 120 and the second generation model 140 are achieved by the model disclosed in Non-Patent Literature 1. Non-Patent Literature 1 discloses a model of a structure in which seven layers of Spatial-temporal Graph Convolutional Networks are connected. The model of NPL 1 is trained using 120 types of motions included in a public data set (NTU–RGB+D). The model of Non-Patent Literature 1 generates pseudo motion data related to the source motion number in response to the input of the source motion number and the noise vector. The model of Non-Patent Literature 1 can generate pseudo motion data regarding up to 120 types of motions.

The relevance calculation unit 15 reconfigures the target motion by a combination of at least one source motion. For example, the relevance calculation unit 15 reconfigures the target motion by a linear combination of at least one source motion. For example, the relevance calculation unit 15 may reconfigure the target motion by non-linearly combining at least one source motion using a neural network or the like. For example, the relevance calculation unit 15 reconfigures the target motion by a linear combination of the source motions using a method such as orthogonal matching pursuit (OMP). The relevance calculation unit 15 calculates the degree of relevance of each source motions with respect to the target motion reconfigured by the linear combination of the source motions. The relevance calculation unit 15 calculates a coefficient of the linearly combined source motion as the degree of relevance between the source motion and the target motion.

The target motion is a motion that can be expressed by combining source motions. The source motion is a motion related to the target motion. The second motion data related to the source motion has a large amount of easily available public data. The first motion data 110 related to the target motion is not included in the source motion and is difficult to obtain as compared with the second motion data.

Expression 2 below is an example of a calculation expression for reconfiguring the target motion (tilde x) by the linear combination of the source motions. Expression 2 below is an example in which the second generation models 140 for the respective source motions are linearly combined. In the following description, symbols different from the symbols in the mathematical formulas may be used.

$$\tilde{x} = a_1 \mathbb{E}_{Z1 \sim p(z)} G_{S_1}(z_1) + a_1 \times \mathbb{E}_{Z2 \sim p(z)} G_{S_2}(z_2) + \ldots a_K \times \mathbb{E}_{ZK \sim p(z)} G_{S_K}(z_K) \quad (2)$$

In Expression 2 above, k represents a source motion number (k is a natural number). $z_k$ represents a noise vector of the source motion number k input to the second generation model 140. $a_k$ represents a degree of relevance of the motion of the source motion number k with respect to the target motion (K is a natural number, and k is a natural number of one or more and equal to or less than K). $G_{sk}(z_k)$ represents the second generation model 140 related to the motion of the source motion number k. $\mathbb{E}_{z1\ to\ p(z)}\ G_{sk}(z_k)$ represents the average of the second generation model 140 $G_{sk}(z_k)$. An object of $\mathbb{E}_{z1\ to\ p(z)}\ G_{sk}(z_k)$ is to reduce individual variations by averaging data regarding a plurality of persons. The second generation model 140 $G_{sk}(z_k)$ outputs $a_k$ as the degree of relevance of the source motion number k.

As another method of reconfiguring the target motion (tilde x), there is a method of finding one source motion closest to the target motion from among the source motions by a nearest neighbor search method (also referred to as a nearest neighbor method). In this method, the coefficient related to the source motion number is set to 1, and the other coefficients are set to zero. As an index of the neighbor search, for example, an index representing similarity such as a mean absolute value error, a root mean square error, or a cosine similarity can be used.

When there is a plurality of target motions, the relevance calculation unit 15 reconfigures the target motion by a linear combination of the source motions using the average motion of the plurality of target motions as the target motion. In a case where there are N target motions $x_i$, the average motion (x bar) is expressed as Expression 3 below (each of N and i is a natural number).

$$\bar{x} = \frac{1}{N} \sum x_i \quad (3)$$

When there is a plurality of target motions, the relevance calculation unit 15 may calculate the degree of relevance ($a_1$, $a_2$, . . . , $a_K$) for each target motion $x_i$ to output an average value of the calculated degrees of relevance as the degree of relevance.

The relevance calculation unit 15 may reconfigure the target motion by a combination of the basis motions. The basis motion corresponds to a higher-order motion of the source motion. For example, the basis motion is a motion in which similar motions among a plurality of source motions are collected. For example, the basis motion is a motion of high importance. For example, the relevance calculation unit 15 applies principal component analysis or sparse coding to public data sets of various motions to acquire the basis motion. For example, the relevance calculation unit uses dictionary training such as a singular value decomposition (K-SVD) method as sparse coding.

The regularization loss calculation unit 16 calculates an index value (regularization loss) indicating a degree of deviation between the pseudo first motion data and the pseudo second motion data. The regularization loss calculation unit 16 calculates a distance of a predetermined probability distribution defined between the pseudo first motion data and at least one pseudo second motion data. The regularization loss calculation unit 16 calculates a regularization loss by weighted averaging the calculated distances of the predetermined probability distribution with the degree of relevance as a weight.

For example, the regularization loss calculation unit 16 calculates a cross-domain distance disclosed in Non-Patent Literature 2 as a distance of a predetermined probability distribution. For example, the regularization loss calculation unit 16 calculates a distance $L_{dist}(G_{s \to t}, G_s)$ of a predetermined probability distribution using Expression 4 below.

$$L_{dist}(G_{s \to t}, G_s) = \mathbb{E}_{\{z_i \sim p_z(z)\}} \sum_{l,i} D_{KL}\left(y_i^{s \to t,l} \| y_i^{s,l}\right) \quad (4)$$

The inside of parentheses of the sum symbol $\Sigma$ on the right side of Expression 4 above is a probability distribution defined in the pseudo first motion data and the pseudo second motion data.

The probability distribution defined in the pseudo data (pseudo first motion data) of the first motion data 110 related to the target motion is expressed by Expression 5 below.

$$y_i^{s \to t,l} = \text{Softmax}(\{\text{sim}(G_{s \to t}{}^l(z_i), G_{s \to t}{}^l(z_j))\} \forall_{i \neq j}) \quad (5)$$

The probability distribution defined in the pseudo data (pseudo second motion data) of the second motion data related to the source motion is expressed by Expression 6 below.

$$y_i^{s,l} = \text{Softmax}(\{\text{sim}(G_s{}^l(z_i), G_s{}^l(z_j))\} \forall_{i \neq j}) \quad (5)$$

The regularization loss calculation unit 16 calculates the regularization loss $L_{reg}$ by performing weighted averaging with the degree of relevance $a_k$ as a weight using Expression 7 below.

$$L_{reg} = \sum_k a_k \times L_{dist}(G_{s \to t}, G_{s_k}) \quad (7)$$

For example, the regularization loss calculation unit 16 calculates the regularization loss $L_{reg}$ using the reconfiguration loss $L_{recon}(G_{s \to t}, G_{sk})$ and the entropy $H_k$. For example, the regularization loss calculation unit 16 calculates the regularization loss $L_{reg}$ using Expression 8 below.

$$L_{reg} = \sum_k a_k \times L_{recon}(G_{s \to t}, G_{sk}) + \mu \cdot e^{-H_k} \quad (8)$$

In Expression 8 above, μ is a coefficient for adjusting the strength of regularization. The reconfiguration loss $L_{recon}(G_{s \to t}, G_{sk})$ is calculated using Expression 9 below.

$$L_{recon}(G_{s \to t}, G_{sk}) = \mathbb{E}_{\{z_i \sim p_z(z)\}}\left\{\min_j(1 - \text{sim}(G_{s \to t}(z_i), G_{sk}(z_j)))\right\} \quad (9)$$

In Expression 8 above, the entropy $H_k$ is calculated using Expression 10 below.

$$H_k = -\Sigma_m p_k[m] \ln p_k[m] \quad (10)$$

In Expression 10 above, $p_k$ is calculated using Expression 11 below.

$$p_k = \mathbb{E}_{\{z_i \sim p_z(z)\}} Onehot \left( \underset{j}{\text{argmax}} (sim(G_{s \to t}(z_i), G_{sk}(z_j))) \right) \quad (11)$$

In Expression 11 above, Onehot(j) is a One-hot encoding function that returns a vector in which only the j-th element is 1 and the other elements are 0.

The adversarial training processing unit 17 adversarially trains the first generation model 120 and the determination model 130 using the determination loss and the regularization loss. For example, the adversarial training processing unit 17 sequentially changes the parameters to adversarially train the first generation model 120 and the determination model 130. The adversarial training processing unit 17 adversarially trains the determination model D and the first generation model G by solving the following min-max (Expression 12).

$$\min_G \max_D L_{adv}(G, D) + \lambda L_{reg}(G, \{G_{s_k}\}) \quad (12)$$

In Expression 12 above, λ is a coefficient for adjusting the strength of regularization.

The adversarial training processing unit 17 updates the first generation model 120 and the determination model 130 that have been adversarially trained. The first generation model 120 trained by the adversarial training processing unit 17 is used to extend the actually measured first motion data 110.

(Operation)

Next, an example of the motion of the training device 10 will be described with reference to the drawings. Hereinafter, the training process by the training device 10 and the regularization loss calculation process included in the training process will be separately described.

[Training Process]

Figure 4:
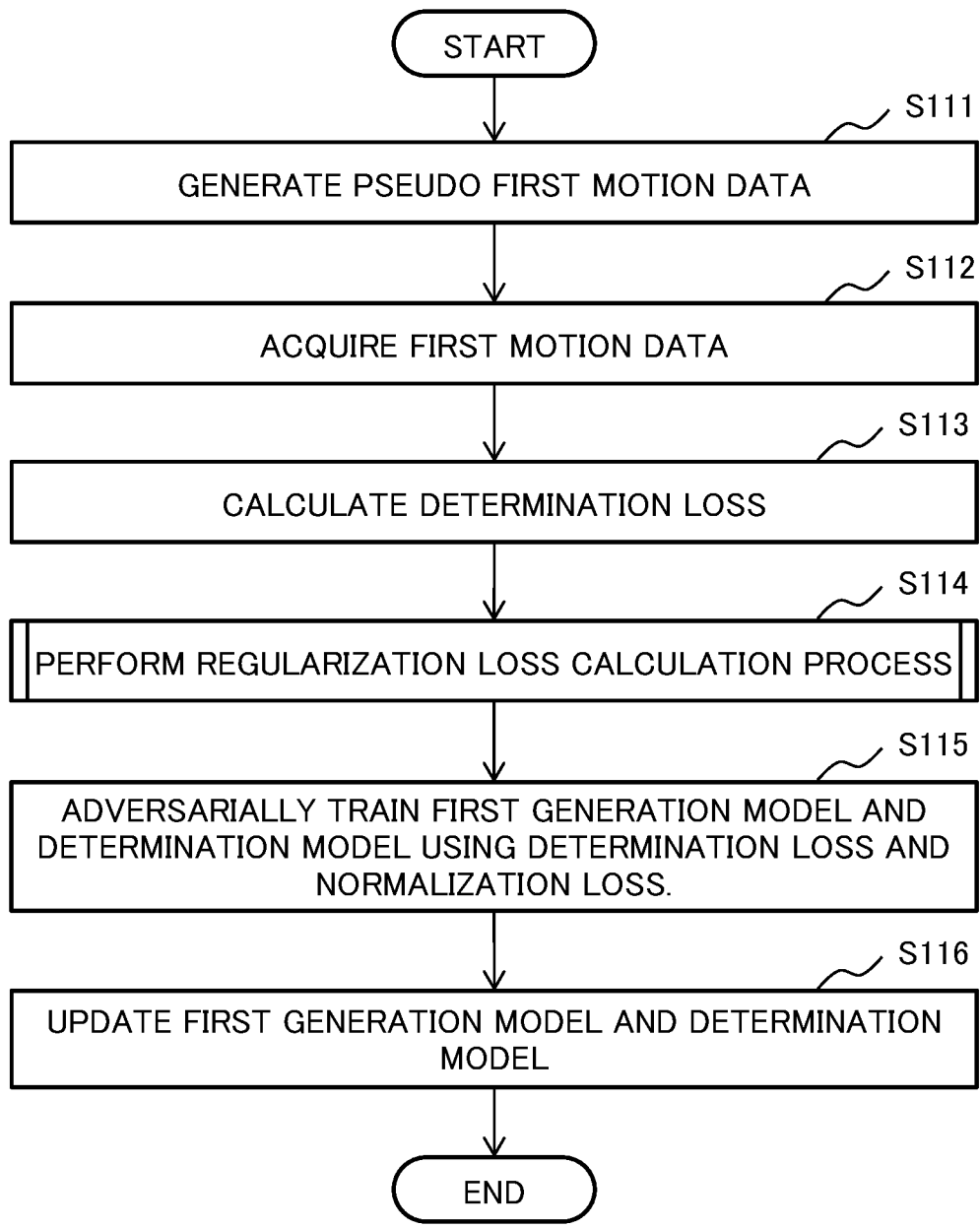
FIG. 4 is a flowchart for describing an example of a training process by the training device according to the first example embodiment.

FIG. 4 is a flowchart for describing an example of the adversarial training process by the training device 10. In the description along the flowchart of FIG. 4, the training device 10 will be described as a motion subject.

In FIG. 4, first, the training device 10 generates pseudo first motion data using the first generation model 120 (step S111).

Next, the training device 10 acquires the actually measured first motion data 110 (step S112). The first motion data 110 is data actually measured for the subject. The order of steps S111 and S112 may be changed. Step S111 and step S112 may be performed in parallel.

Next, the training device 10 calculates the determination loss of the pseudo first motion data and the first motion data 110 using the determination model 130 (step S113).

Next, the training device 10 calculates a regularization loss between the pseudo first motion data and the pseudo second motion data by the regularization loss calculation process (step S114).

Next, the training device 10 adversarially trains the first generation model 120 and the determination model 130 using the determination loss and the regularization loss (step S115).

Next, the training device 10 updates the first generation model 120 and the determination model 130 that have been adversarially trained (step S116).

[Regularization Loss Calculation Process]

Figure 5:
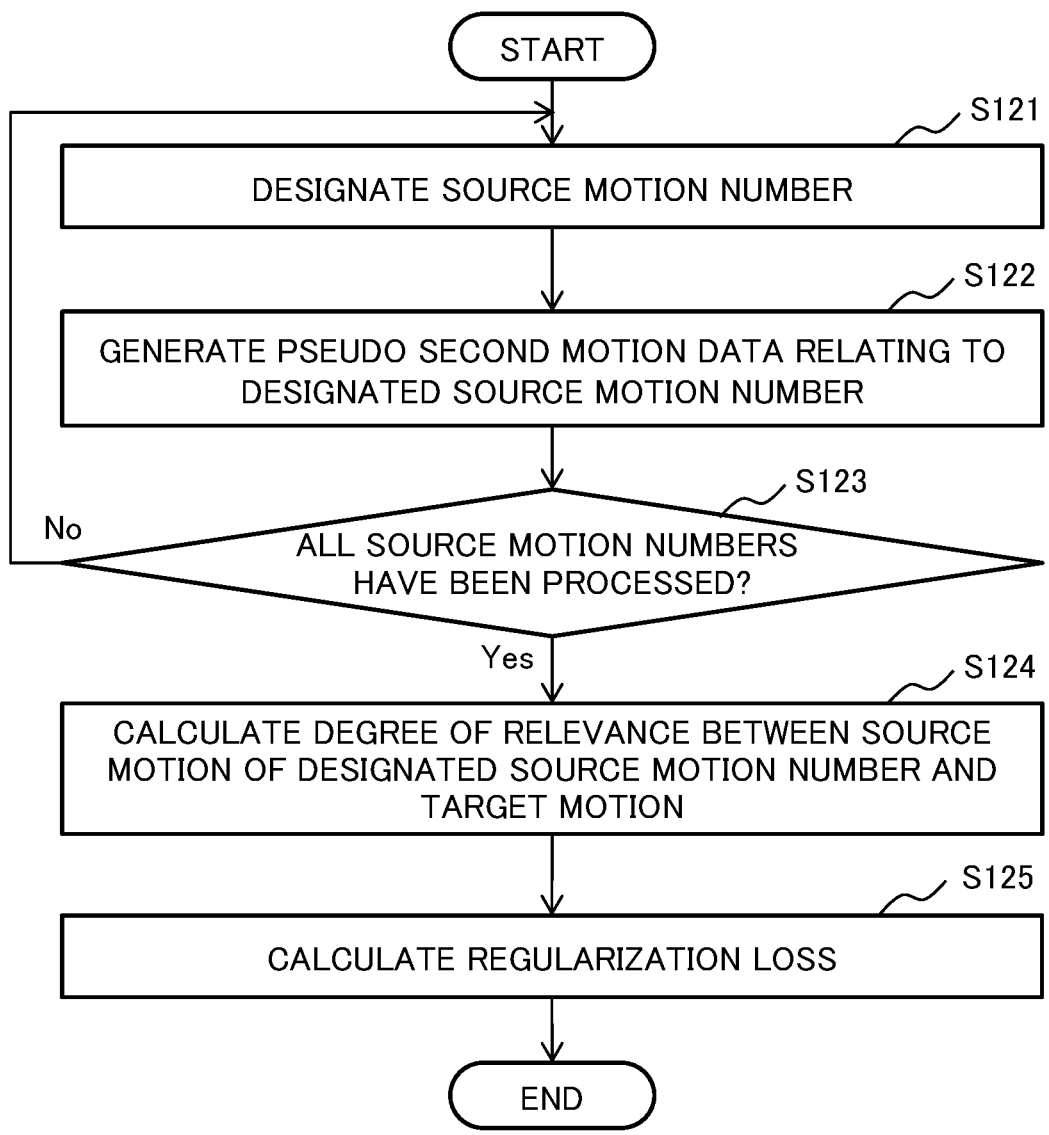
FIG. 5 is a flowchart for describing an example of a regularization loss calculation process included in a training process by the training device according to the first example embodiment.

FIG. 5 is a flowchart for describing an example of the regularization loss calculation process (step S114 in FIG. 4) included in the training process by the training device 10. In the description along the flowchart of FIG. 5, the training device 10 will be described as a motion subject.

In FIG. 5, first, the training device 10 designates a source motion number used for reconfiguring the target motion (step S121).

Next, the training device 10 generates pseudo second motion data related to the designated source motion number using the second generation model 140 (step S122).

When the processing of the pseudo second motion data is completed for the second motion data of all the source motion numbers (Yes in step S123), the training device 10 calculates the degree of relevance between the source motion of the designated source motion number and the target motion (step S124). When the processing of the pseudo second motion data is not completed for the second motion data of all the source motion numbers (No in step S123), the process returns to step S121.

After step S124, the training device 10 calculates a regularization loss between the pseudo first motion data and the pseudo second motion data (step S125). The calculated regularization loss is used for adversarial training of the first generation model 120 and the determination model 130 (proceed to step S115 in FIG. 4).

As described above, the training device according to the present example embodiment includes the motion data acquisition unit, the first generation unit, the determination unit, the second generation unit, the relevance calculation unit, the regularization loss calculation unit, and the adversarial training processing unit. The motion data acquisition unit acquires first motion data related to the target motion. The first generation unit includes a first generation model. The first generation model outputs the pseudo first motion data in response to the input of the first motion data. The determination unit includes a determination model. The determination model determines whether the input motion data is the first motion data or the pseudo first motion data. The determination unit calculates the determination loss indicating a degree of deviation between the first motion data and the pseudo first motion data with respect to the acquired first motion data and the generated pseudo first motion data using the determination model. The second generation unit includes a second generation model. The second generation model outputs pseudo second motion data in response to the input of the second motion data related to the source motion capable of reconfiguring the target motion. The relevance calculation unit reconfigures the target motion by a combination of at least one source motion, and calculates the degree of relevance between the target motion and the source motion. The regularization loss calculation unit calculates a regularization loss indicating a degree of deviation between the pseudo second motion data related to at least one source motion and the pseudo first motion data. The adversarial training processing unit adversarially trains the first generation model and the determination model using the determination loss and the regularization loss.

The cross-domain training disclosed in Non-Patent Literature 2 is not related to Conditional GAN disclosed in Non-Patent Literature 1, and can be applied only to one type of source motion. The target motion is implemented by combining a plurality of source motions. That is, since the method of Non-Patent Literature 2 cannot be applied to a plurality of source motions, a model for generating pseudo data of a target motion cannot be trained.

In the present example embodiment, the target motion is reconfigured by the combination of the source motions, and the degree of relevance between the target motion and the source motion is calculated. In the present example embodiment, a regularization loss between the pseudo second motion data and the pseudo first motion data is calculated. Since the method of the present example embodiment can be applied to a plurality of source motions, the first motion model that generates pseudo data of the target motion can be trained. Therefore, according to the present example embodiment, the first generation model for generating the first motion data regarding the target motion can be trained using the cross-domain training method. That is, according to the present example embodiment, the first generation model (motion generation model) can be trained without causing over-training even with a small amount of first motion data (motion data).

In an aspect of the present example embodiment, the relevance calculation unit reconfigures a combination of source motions by a linear combination. The relevance calculation unit calculates a coefficient of the linearly combined source motion as the degree of relevance. The regularization loss calculation unit calculates a regularization loss by weighted averaging distances of a predetermined probability distribution defined between the second motion data related to the source motion and the pseudo first motion data with a degree of relevance as a weight. According to the present aspect, the training can be applied by the cross-domain training method to the first generation model that generates the first motion data by weighting the plurality of source motions according to the degree of relevance with the target motion and integrating information about diversity (probability distribution).

In an aspect of the present example embodiment, the relevance calculation unit reconfigures the combination of the basis motions by a linear combination. The relevance calculation unit calculates a coefficient of the linearly combined basis motion as the degree of relevance. The regularization loss calculation unit calculates a regularization loss by weighted averaging distances of a predetermined probability distribution defined between the motion data related to the basis motion and the pseudo first motion data with the degree of relevance as a weight. According to the present aspect, the training can be applied by the cross-domain training method to the first generation model that generates the first motion data by weighting the plurality of basis motions according to the degree of relevance with the target motion and integrating information about diversity (probability distribution).

In the present example embodiment, the length of the calculation target time for each of the first motion data, the pseudo first motion data, the second motion data, and the pseudo second motion data is not particularly limited. For example, when the calculation target time related to each motion data is two seconds, the degree of relevance, the determination loss, and the regularization loss can be calculated using the entire data for two seconds. The degree of relevance, the determination loss, and the regularization loss may be calculated using partial data obtained by dividing the motion data of the length of the calculation target time. For example, motion data having a length of two seconds may be decomposed into partial data for one second in the first half and partial data for one second in the second half, and the degree of relevance, the determination loss, and the regularization loss may be calculated using these partial data. The manner of decomposition into partial data is not particularly limited. For example, the motion data for the calculation target time can be decomposed into partial data using a sliding window method or the like in which a time range of a predetermined length is decomposed while being shifted little by little with an overlap allowed.

In the present example embodiment, the joint to be the calculation target of each of the first motion data, the pseudo first motion data, the second motion data, and the pseudo second motion data is not particularly limited. For example, when each piece of motion data includes joint angles of the entire body (neck, shoulder, elbow, wrist, waist, hip joint, knee, ankle, etc.), the degree of relevance, the determination loss, and the regularization loss can be calculated using all the joint angles. For example, the motion data may be decomposed into partial data. For example, the motion data can be decomposed into two partial data of the upper body and the lower body to calculate the degree of relevance, the determination loss, and the regularization loss. For example, the motion data may be decomposed into three partial data of an arm, a torso, and a leg. For example, the motion data may be decomposed into partial data including only one joint. The manner of decomposing the motion data into the partial data is not particularly limited.

Second Example Embodiment

Next, a training device according to a second example embodiment will be described with reference to the drawings. The training device of the present example embodiment is different from that of the first example embodiment in that source motion data (second motion data) acquired from the outside is used.

(Configuration)

Figure 6:
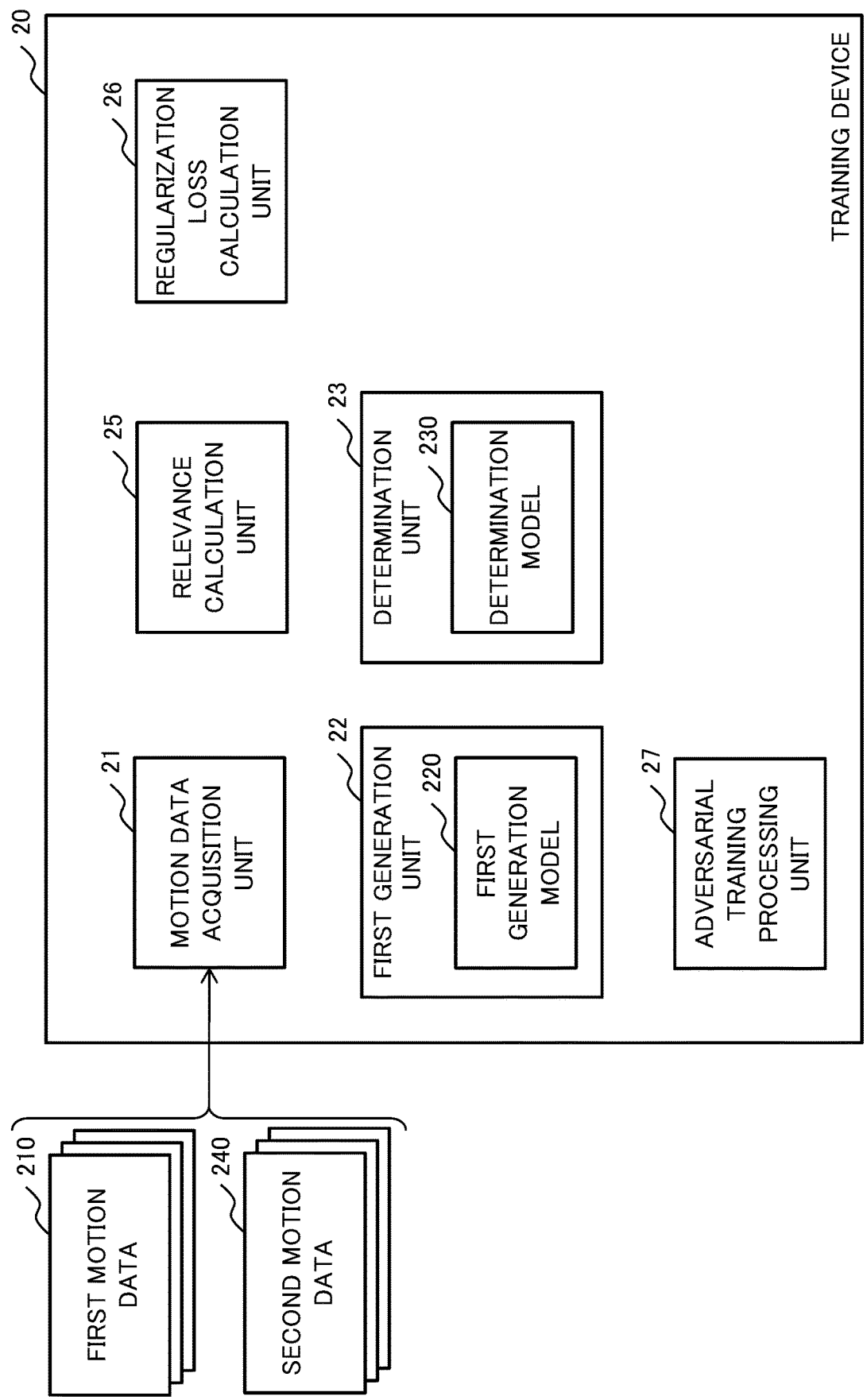
FIG. 6 is a block diagram illustrating an example of a configuration of a training device according to a second example embodiment.

FIG. 6 is a block diagram illustrating an example of a configuration of a training device 20 according to the present example embodiment. The training device 20 includes a motion data acquisition unit 21, a first generation unit 22, a determination unit 23, a relevance calculation unit 25, a regularization loss calculation unit 26, and an adversarial training processing unit 27. In FIG. 6, lines indicating connections between the components are omitted.

The motion data acquisition unit 21 acquires first motion data 210. The first motion data 210 is data of the target domain (target motion data). As in the first example embodiment, the first motion data 210 is motion data extracted from the motion of the subject actually measured.

The motion data acquisition unit 21 acquires second motion data 240. The second motion data 240 is data of the source domain (source motion data). As in the first example embodiment, the second motion data 240 is motion data extracted from the versatile data. For example, the second motion data 240 is selected from the public data set.

The first generation unit 22 has the same configuration as the first generation unit 12 of the first example embodiment. The first generation unit 22 includes a first generation model 220. The first generation model 220 has the same configuration as the first generation model 120 of the first example embodiment. The first generation model 220 is a model (target motion generation model) that generates pseudo data (pseudo first motion data) of the first motion data 210. The first generation unit 22 generates pseudo first motion data using the first generation model 220.

The determination unit 23 has the same configuration as the determination unit 13 of the first example embodiment. The determination unit 23 includes a determination model 230. The determination model 230 has the same configuration as the determination model 130 of the first example embodiment. The determination model 230 is a model for determining whether the input motion data is the first motion data 210 or the pseudo first motion data. The determination unit 23 acquires the first motion data 210 and the first pseudo data as the motion data. The determination unit 23 determines whether the acquired motion data is the first motion data 210 or the first pseudo data using the determination model 230. The determination unit 23 calculates the determination loss related to the acquired motion data according to the determination result.

The relevance calculation unit 25 has the same configuration as the relevance calculation unit 15 of the first example embodiment. The relevance calculation unit 25 reconfigures the target motion by a combination of at least one source motion, and calculates the degree of relevance of the source motion related to the target motion. For example, the relevance calculation unit 25 reconfigures the target motion by a linear combination of the source motions. The relevance calculation unit 25 calculates a coefficient of linear combination as the degree of relevance between the source motion and the target motion. The relevance calculation unit 25 may reconfigure the target motion by a linear combination of the basis motions other than the source motion.

The regularization loss calculation unit 26 has the same configuration as the regularization loss calculation unit 26 of the first example embodiment. The regularization loss calculation unit 26 calculates a regularization loss between the pseudo first motion data and the pseudo second motion data. The regularization loss calculation unit 26 calculates a regularization loss by weighted averaging distances of a predetermined probability distribution defined between the pseudo first motion data and at least one pseudo second motion data with a degree of relevance as a weight.

The adversarial training processing unit 27 has the same configuration as the adversarial training processing unit 17 of the first example embodiment. The adversarial training processing unit 27 adversarially trains the first generation model 220 and the determination model 230 using the determination loss and the regularization loss. The adversarial training processing unit 27 updates the first generation model 220 and the determination model 230 that have been adversarially trained. The first generation model 220 trained by the adversarial training processing unit 27 is used to extend the actually measured first motion data 210.

(Operation)

Next, an example of the motion of the training device 20 will be described with reference to the drawings. Hereinafter, the training process by the training device 20 and the regularization loss calculation process included in the training process will be separately described.

Figure 7:
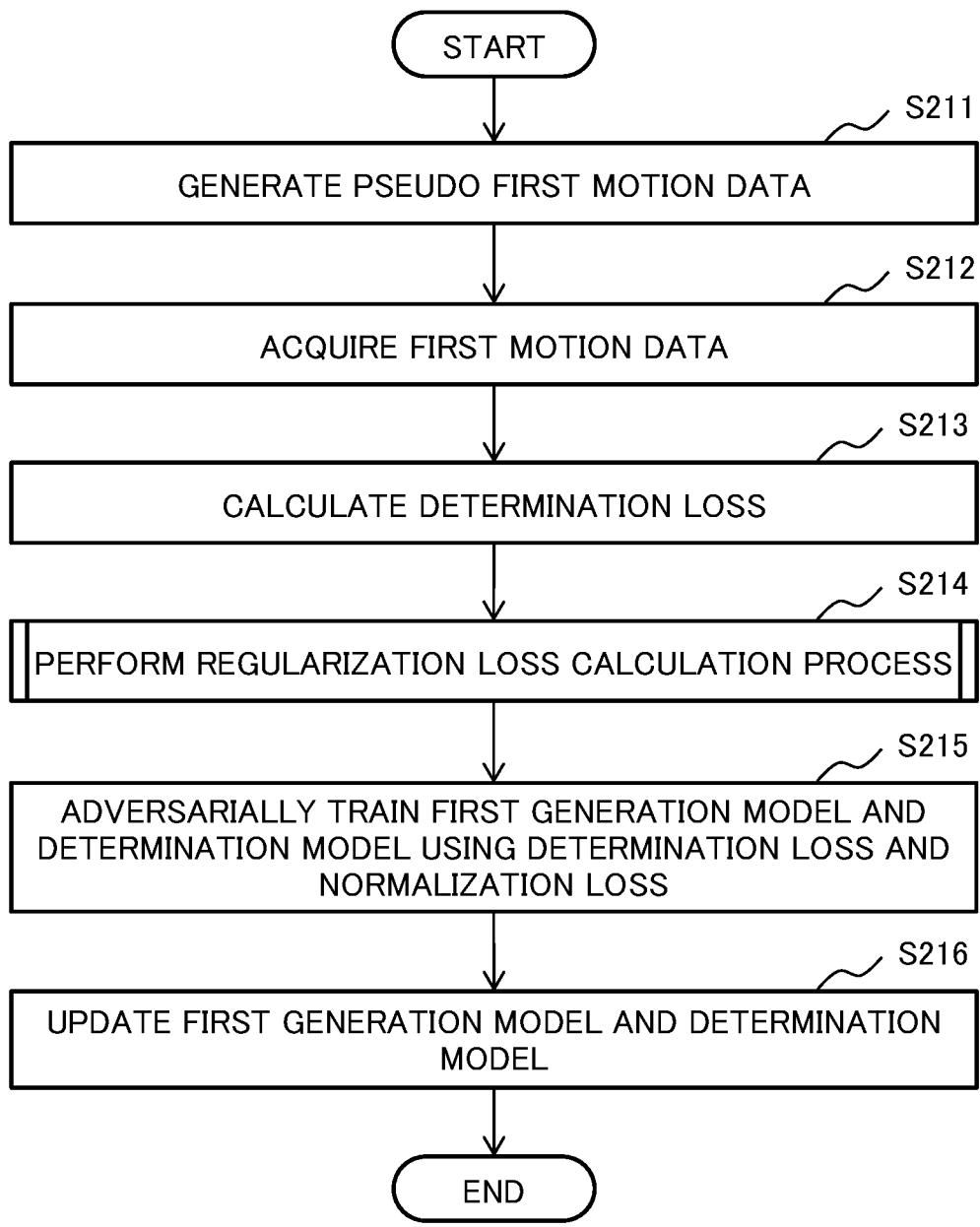
FIG. 7 is a flowchart for describing an example of a training process by the training device according to the second example embodiment.

FIG. 7 is a flowchart for describing an example of the adversarial training process by the training device 20. In the description along the flowchart of FIG. 7, the training device 20 will be described as a motion subject.

In FIG. 7, first, the training device 20 generates pseudo first motion data using the first generation model 220 (step S211).

Next, the training device 20 acquires the actually measured first motion data 210 (step S212). The first motion data 210 is data actually measured for the subject. The order of steps S211 and S212 may be changed. Step S211 and step S212 may be performed in parallel.

Next, the training device 20 calculates the determination loss of the pseudo first motion data and the first motion data 210 using the determination model 230 (step S213).

Next, the training device 20 calculates a regularization loss between the pseudo first motion data and the pseudo second motion data by the regularization loss calculation process (step S214).

Next, the training device 20 adversarially trains the first generation model 220 and the determination model 230 using the determination loss and the regularization loss (step S215).

Next, the training device 20 updates the first generation model 220 and the determination model 230 that have been adversarially trains (step S216).

[Regularization Loss Calculation Process]

Figure 8:
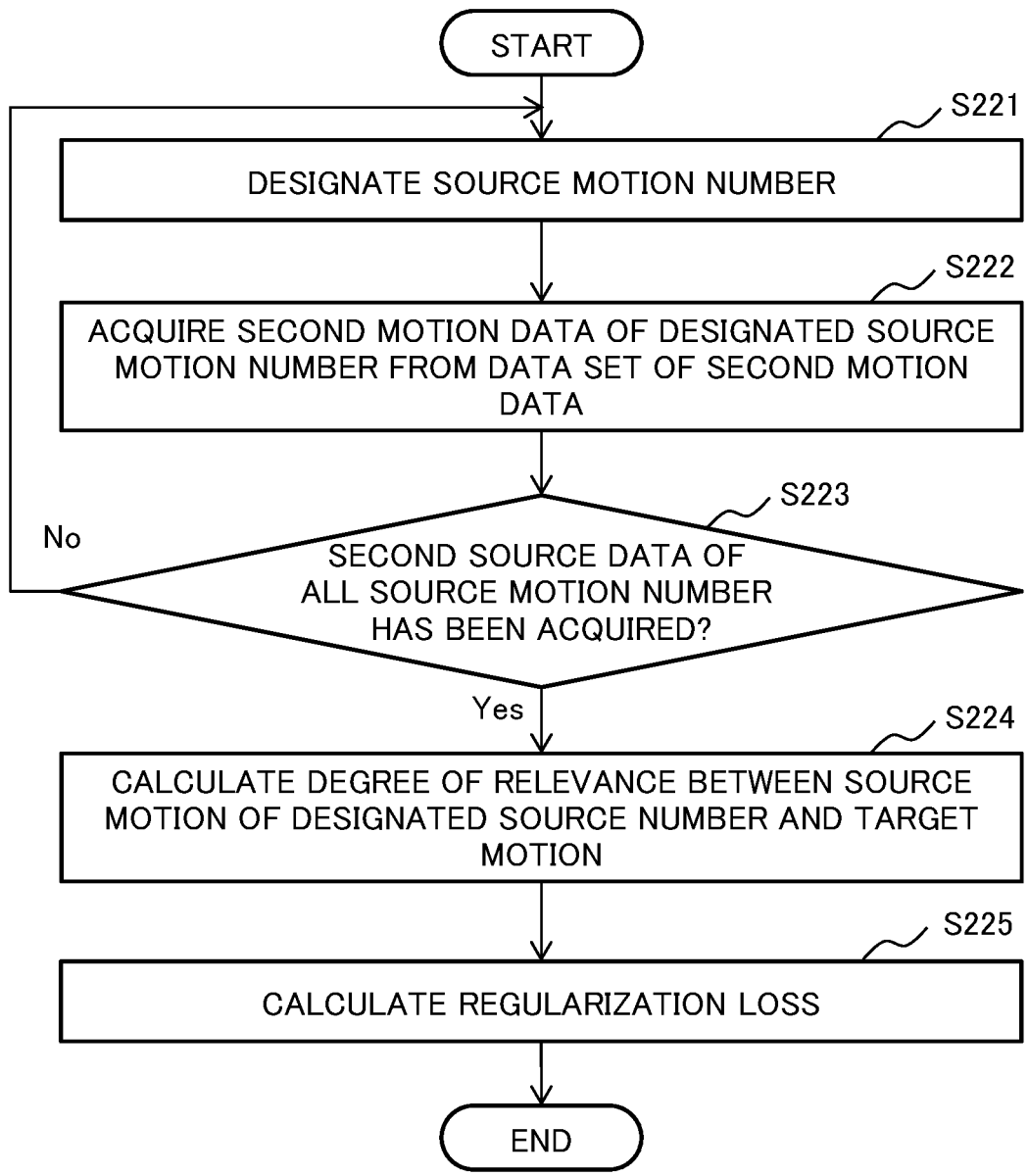
FIG. 8 is a flowchart for describing an example of a regularization loss calculation process included in a training process by the training device according to the second example embodiment.

FIG. 8 is a flowchart for describing an example of the regularization loss calculation process (step S214 in FIG. 7) included in the training process by the training device 20. In the description along the flowchart of FIG. 8, the training device 20 will be described as a motion subject.

In FIG. 8, first, the training device 20 designates a source motion number used for reconfiguring the target motion (step S221).

Next, the training device 20 acquires the second motion data 240 related to the designated source motion number (step S222).

When the acquisition of the second motion data 240 regarding the source motions of all the source motion numbers is completed (Yes in step S223), the training device 20 calculates the degree of relevance between the source motion of the designated source motion number and the target motion (step S224). When the acquisition of the second motion data 240 related to all the source motion numbers is not completed (No in step S223), the process returns to step S221.

After step S224, the training device 20 calculates a regularization loss between the pseudo first motion data and the pseudo second motion data (step S225). The calculated regularization loss is used for adversarial training of the first generation model 220 and the determination model 230 (proceed to step S215 in FIG. 7).

As described above, the training device according to the present example embodiment includes the motion data acquisition unit, the first generation unit, the determination unit, the relevance calculation unit, the regularization loss calculation unit, and the adversarial training processing unit. The motion data acquisition unit acquires first motion data related to the target motion. The motion data acquisition unit acquires second motion data related to the source motion. The first generation unit includes a first generation model. The first generation model outputs the pseudo first motion data in response to the input of the first motion data. The determination unit includes a determination model. The determination model determines whether the input motion data is the first motion data or the pseudo first motion data. The determination unit calculates the determination loss indicating a degree of deviation between the first motion data and the pseudo first motion data with respect to the acquired first motion data and the generated pseudo first motion data using the determination model. The relevance calculation unit reconfigures the target motion by a combination of at least one source motion, and calculates the degree of relevance between the target motion and the source motion. The regularization loss calculation unit calculates a regularization loss indicating a degree of deviation between at least one the second motion data and the pseudo first motion data. The adversarial training processing unit adversarially trains the first generation model and the determination model using the determination loss and the regularization loss.

In the present example embodiment, the regularization loss is calculated using the second motion data itself without using the pseudo second motion data of the second motion data (source motion data) related to the source motion. A public data set can be used as the second motion data. Public data sets are easy to obtain in large quantities. That is, according to the present example embodiment, the first generation model (motion generation model) can be trained without generating the pseudo second motion data.

Third Example Embodiment

Next, a data extension system according to a third example embodiment will be described with reference to the drawings. The data extension system of the present example embodiment extends the actually measured target data using the model (first generation model) trained by the training devices of the first and second example embodiments. In the present example embodiment, an example of extending the time series data (time series skeleton data) of the target data measured according to the target motion of the subject will be described.

(Configuration)

Figure 9:
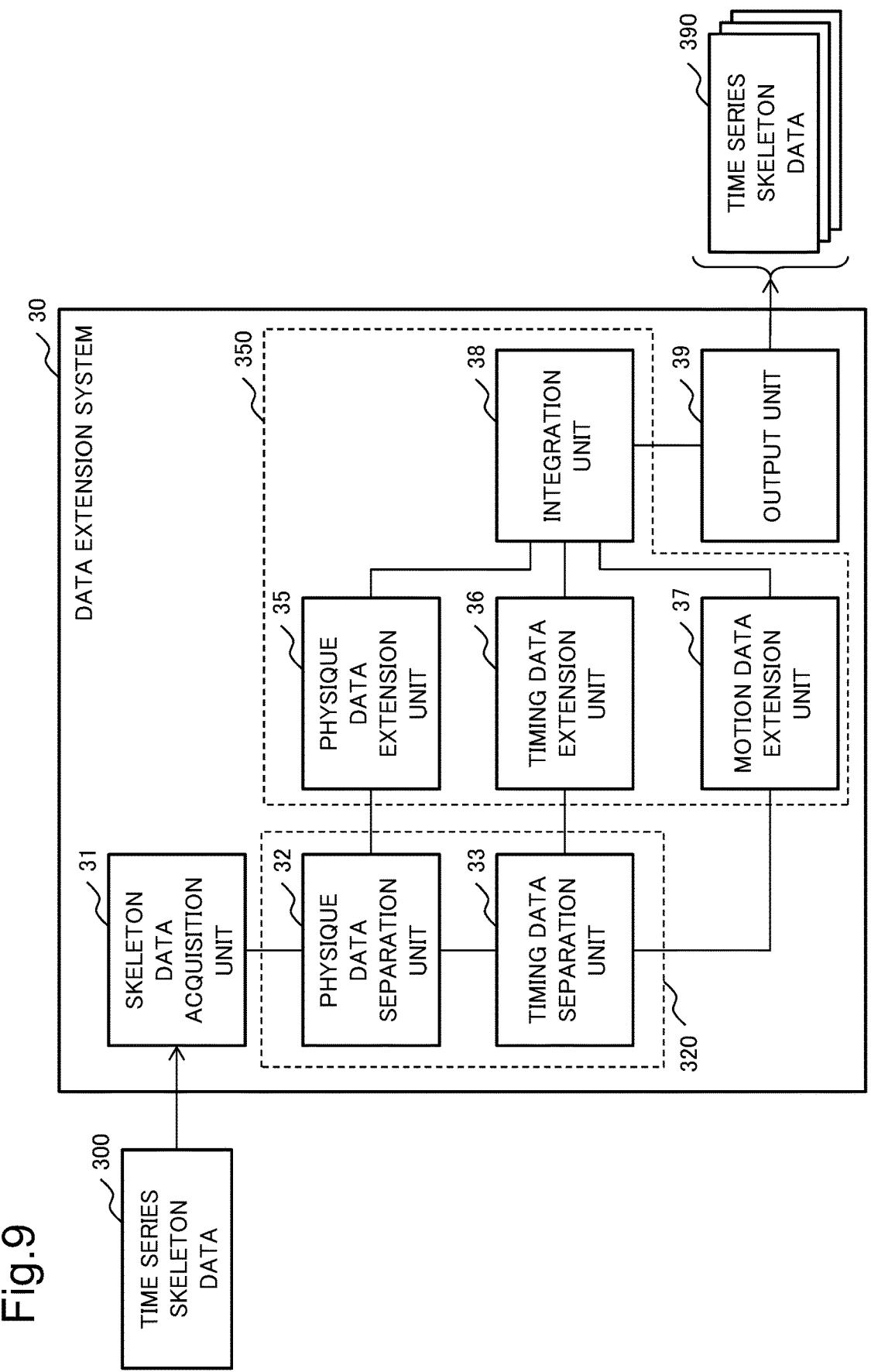
FIG. 9 is a block diagram illustrating an example of a configuration of a data extension system according to a third example embodiment.

FIG. 9 is a block diagram illustrating an example of a configuration of a data extension system 30 according to the present example embodiment. The data extension system 30 includes a skeleton data acquisition unit 31, a physique data separation unit 32, a timing data separation unit 33, a physique data extension unit 35, a timing data extension unit 36, a motion data extension unit 37, an integration unit 38, and an output unit 39. The physique data separation unit 32 and the timing data separation unit 33 constitute an information separation device 320. The physique data extension unit 35, the timing data extension unit 36, the motion data extension unit 37, and the integration unit 38 constitute an extension device 350.

The skeleton data acquisition unit 31 acquires time series data (time series skeleton data) related to skeleton data extracted from moving image data actually measured for a subject (person). The skeleton data includes a three-dimensional position of the joint of the subject measured by motion capture or the like. The time series skeleton data is time series data of skeleton data according to the motion of the subject.

The physique data separation unit 32 separates the physique data of the subject from the time series skeleton data. The physique data includes information about the physique of the subject. The physique data relates to an attribute element of the subject. For example, the physique data includes information related to a length of a part such as an arm, a leg, a torso, and a shoulder width of the subject.

The timing data separation unit 33 acquires timing data from the remaining time series skeleton data when the physique data has been separated from the data. The timing data includes information about the time of the motion performed by the subject. The timing data relates to a time element of the motion performed by the subject. For example, the timing data includes information related to a gait cycle in gait of the subject, a weight kept on the foot when the subject jumps, and the like.

The time series skeleton data from which the timing data is separated is set as motion data. The motion data relates to a change in posture during a motion performed by the subject. The individual skeleton data constituting the time series skeleton data set in the motion data is also referred to as posture data. The posture data is a spatial element of the motion performed by the subject. The three-dimensional joint angles (Euler angles) extracted from the skeleton data correspond to the first motion data (target motion data) of the first to second example embodiments. In the present example embodiment, first motion data related to a three-dimensional joint angle (Euler angle) is set as motion data. The motion data may be data other than the three-dimensional joint angle (Euler angle).

The physique data extension unit 35 extends the physique data by changing attribute elements of the subject. For example, the physique data extension unit 35 extends the physique data by increasing variations regarding the lengths of parts such as an arm, a leg, a torso, and a shoulder width according to the attribute of the subject. The physique data extension unit 35 outputs a data set (extension physique data set) of the extended physique data to the integration unit 38.

For example, in a case where the subject is a male, the physique data extension unit 35 extends the physique data in accordance with an average value or distribution of lengths of parts related to males. For example, the physique data extension unit 35 extends the physique data by changing the attribute of the subject and increasing variations in the lengths of the parts. For example, in a case where the subject is female, the physique data extension unit 35 extends the physique data in accordance with the average value or distribution of the lengths of parts related to women. For example, in a case where the subject is a child, the physique data extension unit 35 extends the physique data in accordance with an average value or distribution of lengths of parts related to children.

For example, the physique data extension unit 35 may extend the physique data by changing the nationality of the subject and increasing variations in the length of the parts. For example, in a case where the nationality of the subject is the US, the physique data extension unit 35 extends the physique data according to the average value or distribution of the lengths of parts related to persons whose nationality is the US.

The timing data extension unit 36 extends the timing data by changing a time element of the motion performed by the subject. For example, the timing data extension unit 36 extends the timing data by increasing variations related to the time element of the motion performed by the subject. The timing data extension unit 36 outputs a data set (extension timing data set) of the extended timing data to the integration unit 38.

For example, the timing data extension unit 36 extends the timing data by varying the ratio of the swing phase or the stance phase in the gait cycle detected from the gait of the subject. For example, the timing data extension unit 36 extends the timing data by changing the intervals of gait events such as heel contact, heel rise, toe off, foot adjacent, and tibia vertical detected from the gait of the subject. For example, the timing data extension unit 36 extends the timing data in accordance with the average value or variance of persons having the same attribute as the subject. For example, the timing data extension unit 36 extends the timing data in accordance with an average value or variance of persons having different attributes from the subject.

The motion data extension unit 37 extends the motion data. The motion data extension unit 37 extends the motion data by increasing variations of the plurality of pieces of posture data constituting the motion data. The motion data extension unit 37 outputs a data set (extension motion data set) of the extended motion data to the integration unit 38.

For example, the motion data extension unit 37 extends the motion data using the model (first generation model) trained by the training device according to the first and second example embodiments. In this case, the motion data extends motion data related to three-dimensional joint angles (Euler angles). The motion data extension unit 37 may extend the motion data using a model other than the first generation model.

The integration unit 38 acquires the extension physique data set, the extension timing data set, and the extension motion data set. The integration unit 38 integrates the data included in each of the extension physique data set, the extension timing data set, and the extension motion data set that were acquired to extend the time series skeleton data. The integration unit 38 extends the skeleton data by combining the extension physique data, the extension timing data, and the extension motion data.

The output unit 39 outputs the extended time series skeleton data 390. For example, the extended time series skeleton data 390 is used for training a model for predicting the motion of the subject. The application of the extended time series skeleton data 390 is not particularly limited.

(Operation)

Next, an example of a motion of the data extension system 30 according to the present example embodiment will be described with reference to the drawings. Hereinafter, the data extension process by the data extension system 30, and the information separation process and the extension process included in the data extension process will be described.

Figure 10:
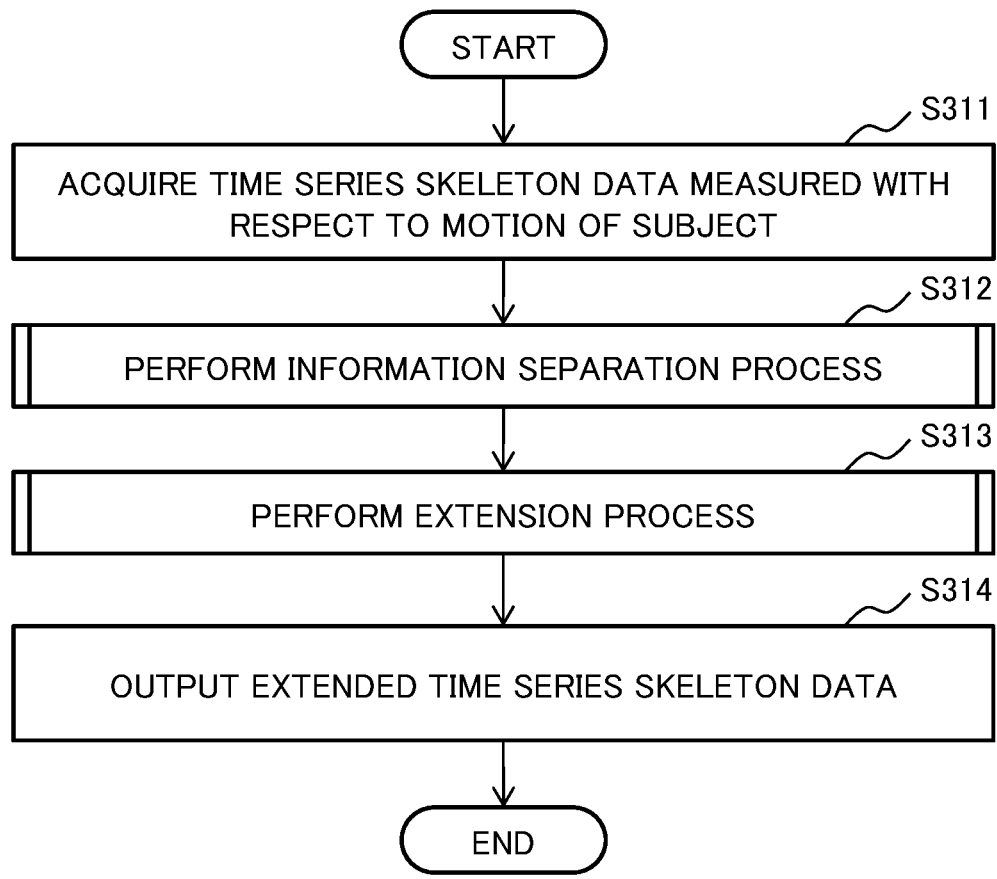
FIG. 10 is a flowchart for describing an example of a data extension process by the data extension system according to the third example embodiment.

FIG. 10 is a flowchart for describing an example of the motion of the data extension system 30. In the description along the flowchart of FIG. 10, the data extension system 30 will be described as a motion subject.

In FIG. 10, first, the data extension system 30 acquires time series skeleton data measured regarding the motion of the subject (step S311).

Next, the data extension system 30 executes an information separation process to separate the time series skeleton data into the physique data, the timing data, and the motion data (step S312).

Next, the data extension system 30 executes an extension process to extend each of the physique data, the timing data, and the motion data (step S313).

Next, the data extension system 30 outputs the extended time series skeleton data (step S314). The extended time series skeleton data is used for various applications. For example, the extended time series skeleton data is used for training a model for predicting the motion of the subject.

[Information Separation Process]

Figure 11:
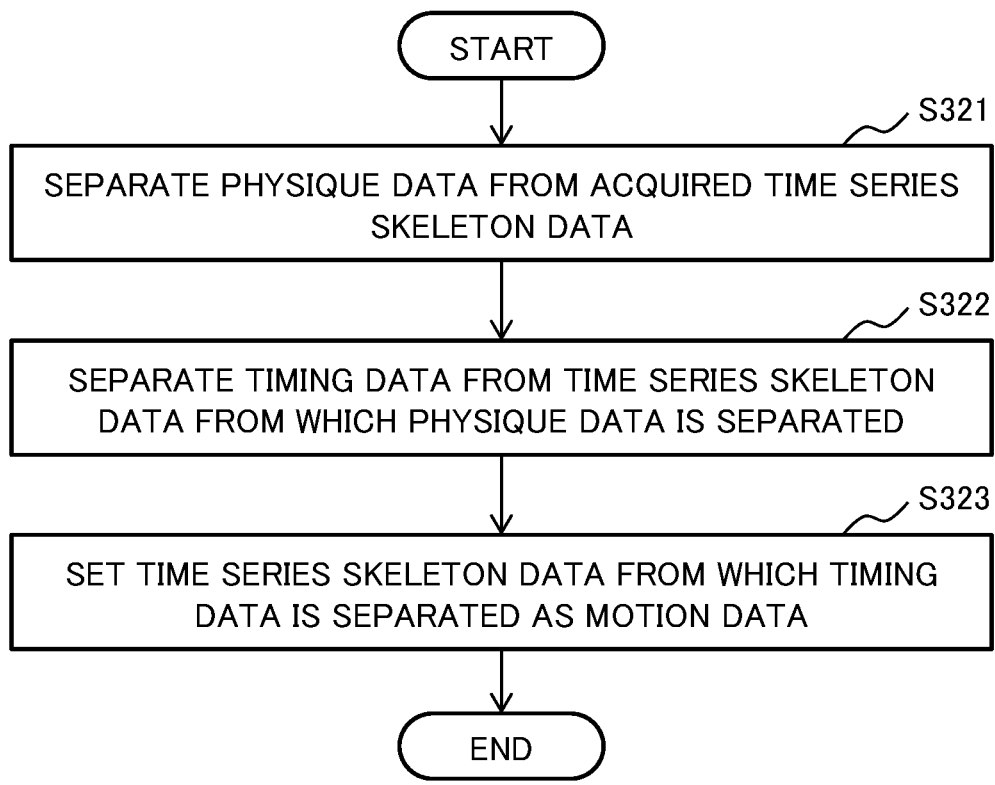
FIG. 11 is a flowchart for describing an example of an information separation process included in a data extension process by the data extension system according to the third example embodiment.

FIG. 11 is a flowchart for describing an example of the information separation process (step S312 in FIG. 10) included in the data extension process by the data extension system 30. In the description along the flowchart of FIG. 11, the information separation device 320 included in the data extension system 30 will be described as a motion subject.

In FIG. 11, first, the information separation device 320 separates the physique data from the acquired time series skeleton data (step S321). The separated physique data is used for data extension by the extension device 350 included in the data extension system 30.

Next, the information separation device 320 separates the timing data from the time series skeleton data from which the physique data is separated (step S322). The separated timing data is used for data extension by the extension device 350 included in the data extension system 30.

Next, the information separation device 320 sets the time series skeleton data from which the timing data is separated as the motion data (step S323). After step S323, the process proceeds to the extension process in step S313 in FIG. 10.

The set motion data is used for data extension by the extension device 350 included in the data extension system 30.

[Data Extension Process]

Figure 12:
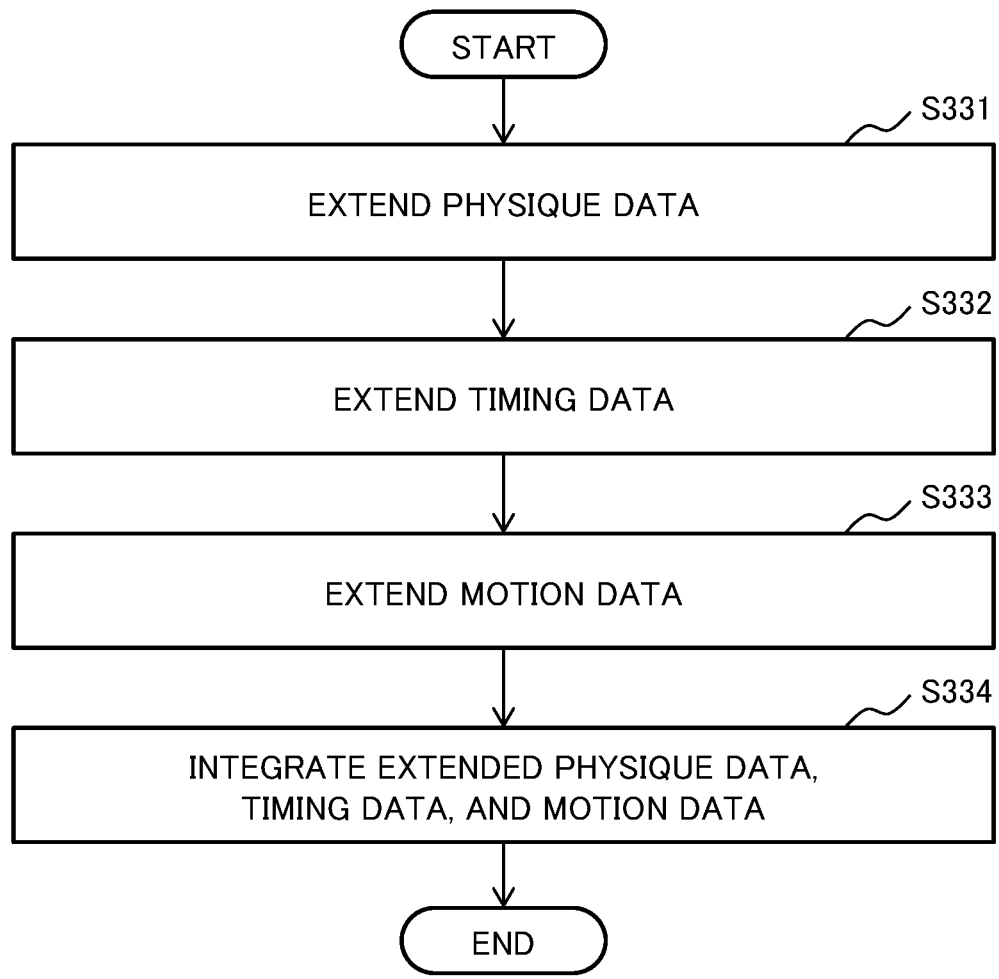
FIG. 12 is a flowchart for describing an example of an extension process included in a data extension process by the data extension system according to the third example embodiment.

FIG. 12 is a flowchart for describing an example of the extension process (step S313 in FIG. 10) included in the data extension process by the data extension system 30. In the description along the flowchart of FIG. 12, the extension device 350 included in the data extension system 30 will be described as a motion subject.

In FIG. 12, first, the extension device 350 extends the physique data (step S331). The extended physique data constitutes an extension physique data set.

Next, the extension device 350 extends the timing data (step S332). The extended timing data constitutes an extension timing data set.

Next, the extension device 350 extends the motion data (step S333). The extended motion data constitutes an extension motion data set.

Next, the extension device 350 extends the time series skeleton data by integrating the data included in each of the extension physique data set, the extension timing data set, and the motion data (step S334). After step S334, the process proceeds to step S314 in FIG. 10.

As described above, the data extension system of the present example embodiment extends the motion data (time series skeleton data) using the first generation model trained by the first to second training devices. The data extension system according to the present example embodiment includes an information separation device and an extension device. The information separation device acquires time series skeleton data measured according to the motion of the person. The information separation device separates the physique data, the timing data, and the motion data from the time series skeleton data. The physique data is data related to an attribute element of a person. The timing data is data related to a time element of the action performed by the person. The motion data is data related to a change in posture during a motion performed by a person. The extension device extends each of the physique data, the timing data, and the motion data. The extension device extends the time series skeleton data by integrating the physique data, the timing data, and the motion data that were extended. The extension device extends the motion data using the first generation model. In the data extension system, the extension device outputs the extended time series skeleton data.

The data extension system of the present example embodiment individually extends each of the physique data, the timing data, and the motion data. The data extension system of the present example embodiment extends the time series skeleton data by combining and integrating the physique data, the timing data, and the motion data that were individually extended. The data extension system according to the present example embodiment can provide a wide variety of time series skeleton data regarding the attribute of the person, the time element of the motion performed by the person, and the change in posture during the motion performed by the person. Therefore, according to the present example embodiment, it is possible to extend the time series skeleton data applicable to training on the motions of various persons using a small amount of motion data.

In an aspect of the present example embodiment, the information separation device includes a physique data separation unit and a timing data separation unit. The physique data separation unit separates the physique data from the time series skeleton data. The timing data separation unit separates the timing data from the time series skeleton data from which the physique data is separated. The time series skeleton data in which the physique data and the timing data are separated is the motion data. The extension device includes a physique data extension unit, a timing data extension unit, a motion data extension unit, and an integration unit. The physique data extension unit extends the physique data by changing the attribute element. The timing data extension unit extends the timing data by changing the time element. The motion data extension unit extends the motion data by generating the pseudo motion data output from the first generation model in response to the input of the motion data. The integration unit integrates the physique data, the timing data, and the motion data that were extended to extend the time series skeleton data. In the present aspect, the attribute element is changed to increase the variation of the physique data, and the time element is changed to increase the timing data. In the present aspect, the pseudo motion data is generated using the first generation model (motion generation model) trained with a small amount of motion data. According to the present aspect, it is possible to extend the time series skeleton data applicable to training on motions of various persons using a small amount of motion data.

Fourth Example Embodiment

Next, an estimation device according to a fourth example embodiment will be described with reference to the drawings. The estimation device of the present example embodiment uses an estimation model trained using time series skeleton data extended by the data extension system of the third example embodiment. The estimation device according to the example embodiment generates motion data (estimation data) based on motion data (actual data) actually measured using the estimation model. The estimation device of the present example embodiment may be configured to use an estimation model trained using the motion data extended by the data extension system of the third example embodiment. In the present example embodiment, an example of estimating the time series skeleton data (estimation data) related to the motion of the subject using the time series skeleton data (actual data) actually measured according to the target motion of the subject will be described.
(Configuration)

Figure 13:
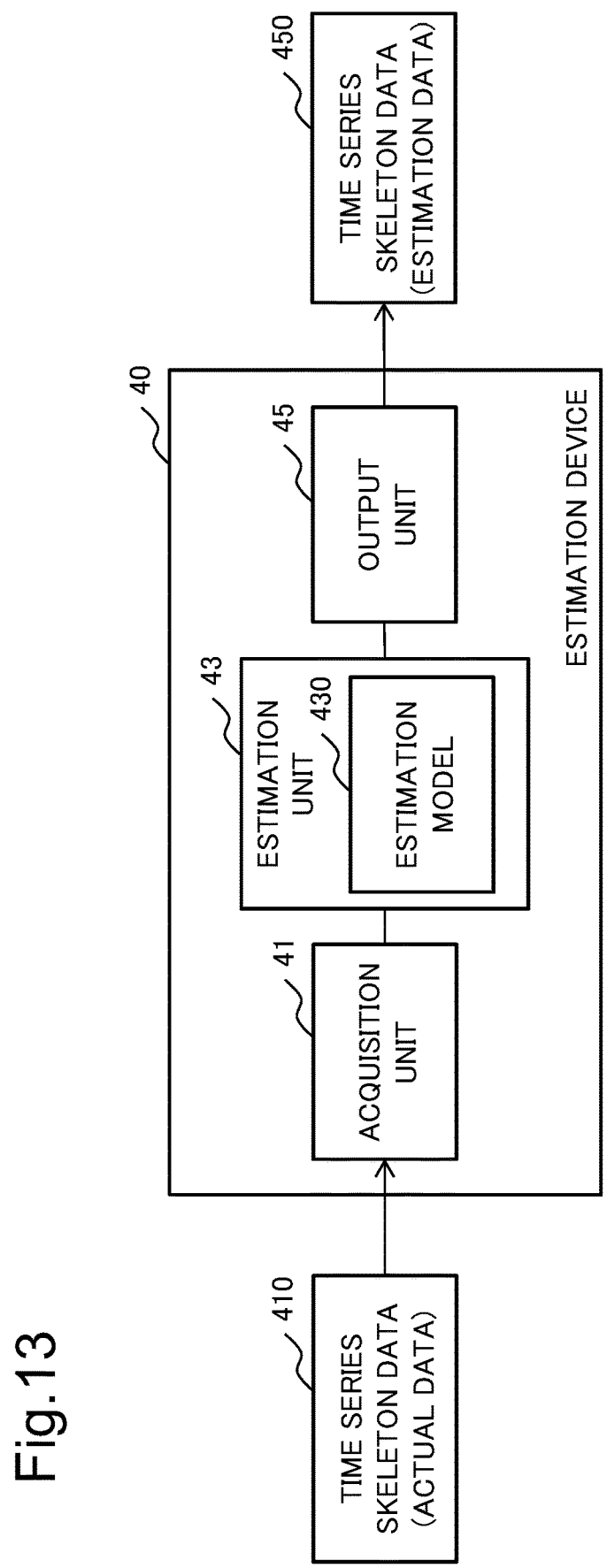
FIG. 13 is a block diagram illustrating an example of a configuration of an estimation device according to a fourth example embodiment.

FIG. 13 is a block diagram illustrating an example of a configuration of an estimation device 40. The estimation device 40 includes an acquisition unit 41, an estimation unit 43, and an output unit 45.

The acquisition unit 41 acquires time series skeleton data 410 (actual data). The time series skeleton data 410 is data measured regarding the motion of the subject. For example, the time series skeleton data 410 includes time series skeleton data. The skeleton data includes a three-dimensional position of the joint of the subject measured by motion capture or the like.

The estimation unit 43 includes an estimation model 430. The estimation model 430 is a model trained using time series skeleton data extended by the data extension system of the third example embodiment. The estimation model 430 outputs time series skeleton data 410 (estimation data) in response to the input of the time series skeleton data 450 (actual data). The estimation unit 43 inputs the time series skeleton data 410 to the estimation model 430, and estimates the motion of the subject according to the time series skeleton data 450 output from the estimation model 430.

The output unit 45 outputs the time series skeleton data 450 estimated using the estimation model 430. The output destination and application of the time series skeleton data 450 are not particularly limited. For example, the time series skeleton data 450 is displayed on a screen that can be visually recognized by the subject. For example, the time series skeleton data 450 is output to a terminal device used by a trainer that manages the exercise state of the subject, a care manager that manages the health condition of the subject, or the like.

Figure 14:
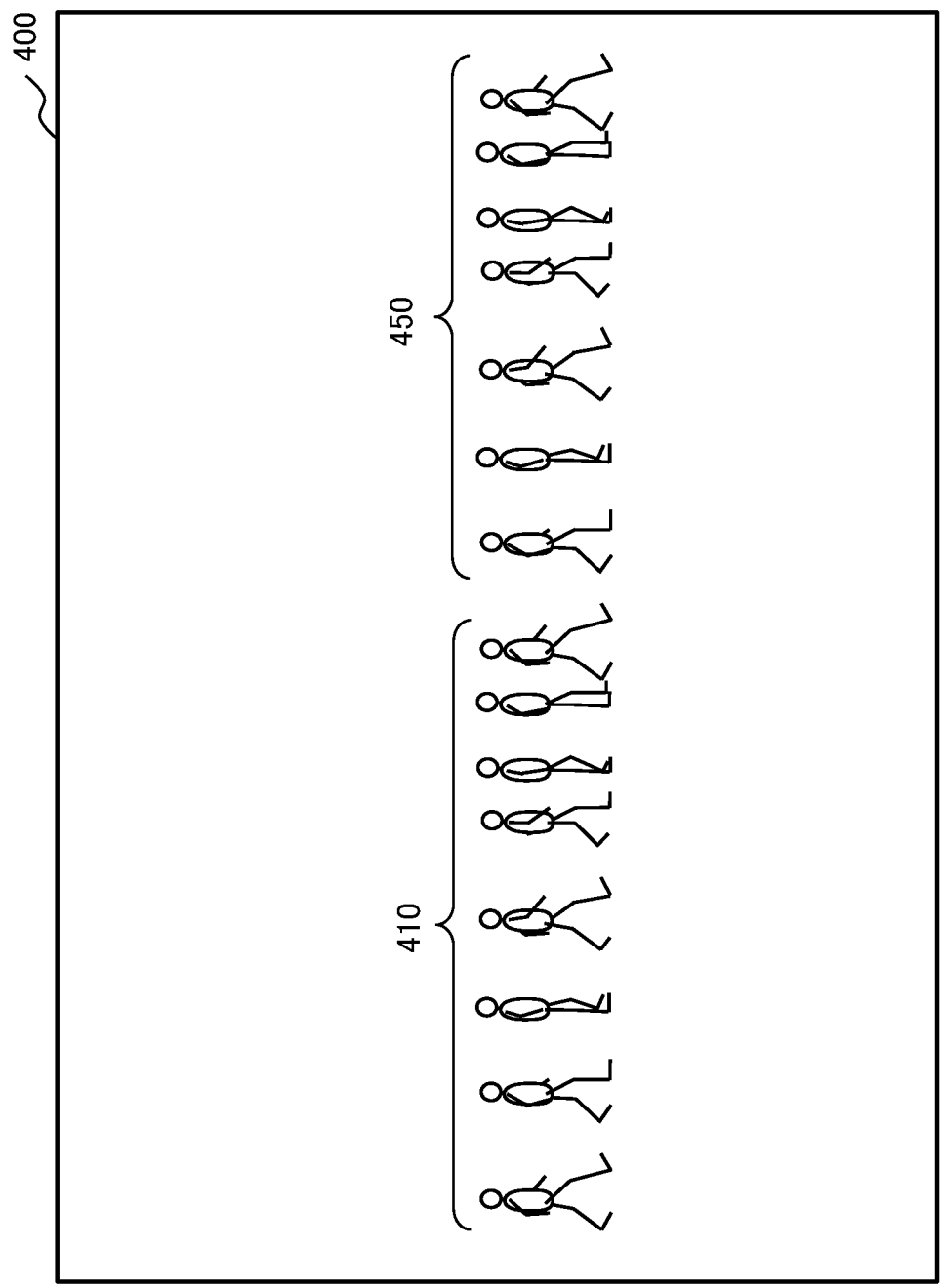
FIG. 14 is a conceptual diagram illustrating a display example of motion data estimated by the estimation device according to the fourth example embodiment.

FIG. 14 illustrates an example in which the time series skeleton data 450 estimated by the estimation device 40 is displayed on a screen 400 of the terminal device. On the screen 400, the time series skeleton data 450 is displayed following the time series skeleton data 410 measured regarding the gait of the subject. In the example of FIG. 14, an image in which flesh is put on part of the skeleton is displayed. For example, flesh may be put on the skeleton or clothes or footwear may be worn using software. According to the present example embodiment, even when the subject does not actually continue gait, the future gait state of the subject can be estimated according to the gait state actually measured for the subject.

As described above, the estimation device of the present example embodiment estimates the motion of the person using the estimation model trained using the time series skeleton data extended by the data extension system of the third example embodiment. The estimation device according to the present example embodiment includes an acquisition unit, an estimation unit, and an output unit. The acquisition unit acquires actual data (time series skeleton data) measured according to the motion of the person. The estimation unit estimates the motion of the person using the estimation data (time series skeleton data) output from the estimation model in response to the input of the actual data. The output unit outputs the estimated estimation data (time series skeleton data).

The estimation device of the present example embodiment uses an estimation model trained using time series skeleton data extended by the data extension system of the third example embodiment. The estimation model is a model trained in such a way that motions of various persons can be estimated using a small amount of time series skeleton data. Therefore, the estimation device of the present example embodiment can simulate motions of various people.

In the present example embodiment, an example is described in which the time series skeleton data (estimation data) of the subject is estimated using the time series skeleton data (actual data) actually measured according to the target motion of the subject. The information estimated by the estimation device of the present example embodiment is not limited to the time series skeleton data. As an example, the present example embodiment is applied to motion recognition for recognizing what motion the subject is performing. For example, by using the time series skeleton data extended by the data extension system of the third example embodiment, the estimation model can be trained using a small amount of time series skeleton data related to three motions of grasping, carrying, and placing objects. The estimation device of the present example embodiment can recognize motions of grasping, carrying, and placing an object using the estimation model. For example, the recognition result can be used for business visualization in distribution.

Fifth Example Embodiment

Next, an example of a training device according to the fifth example embodiment will be described with reference to the drawings. The training device of the present example embodiment has a configuration in which the training devices of the first and second example embodiments are simplified.

Figure 15:
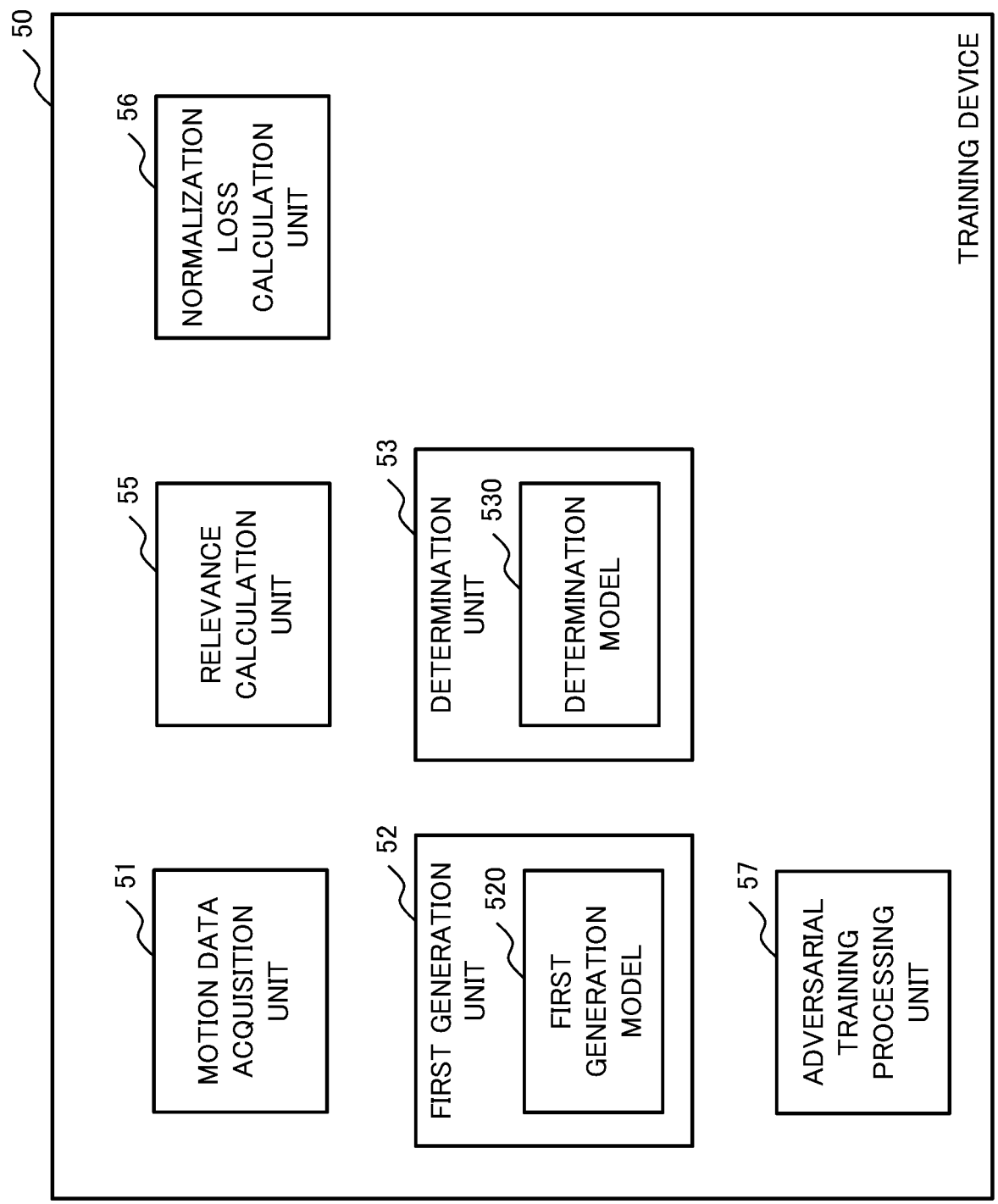
FIG. 15 is a block diagram illustrating an example of a configuration of a training device according to a fifth example embodiment.

FIG. 15 is a block diagram illustrating an example of a configuration of a training device 50 according to the present example embodiment. The training device 50 includes a motion data acquisition unit 51, a first generation unit 52, a determination unit 53, a relevance calculation unit 55, a regularization loss calculation unit 56, and an adversarial training processing unit 57.

The motion data acquisition unit 51 acquires first motion data related to the target motion. The first generation unit 52 includes a first generation model 520 that outputs the pseudo first motion data in response to the input of the first motion data. The determination unit 53 includes a determination model 530. The determination model 530 determines whether the input motion data is the first motion data or the pseudo first motion data. The determination unit 53 calculates the determination loss indicating a degree of deviation between the first motion data and the pseudo first motion data with respect to the acquired first motion data and the generated pseudo first motion data using the determination model. The relevance calculation unit 55 reconfigures the target motion by a combination of at least one basis motion. The relevance calculation unit 55 calculates the degree of relevance between the target motion and the basis motion. The regularization loss calculation unit 56 calculates a regularization loss indicating the degree of deviation between the motion data related to at least one basis motion and the pseudo first motion data. The adversarial training processing unit 57 adversarially trains the first generation model 520 and the determination model 530 using the determination loss and the regularization loss.

In the present example embodiment, the target motion is reconfigured by the combination of the basis motions, and the degree of relevance between the target motion and the basis motion is calculated. Then, in the present example embodiment, the regularization loss between the motion data related to at least one basis motion and the pseudo first motion data is calculated. Since the method of the present example embodiment can be applied to a plurality of basis motions, the first motion model for generating the pseudo data of the target motion can be trained. Therefore, according to the present example embodiment, the first generation model for generating the first motion data regarding the target motion can be trained using the cross-domain training method. That is, according to the present example embodiment, the first generation model (motion generation model) can be trained without causing over-training even with a small amount of first motion data (motion data).

(Hardware)

Next, a hardware configuration that executes control and processing according to each example embodiment of the present example disclosure will be described with reference to the drawings. An example of such a hardware configuration is an information processing device 90 (computer) in FIG. 16. The information processing device 90 in FIG. 16 is a configuration example for executing control and processing of each example embodiment, and does not limit the scope of the present example disclosure.

Figure 16:
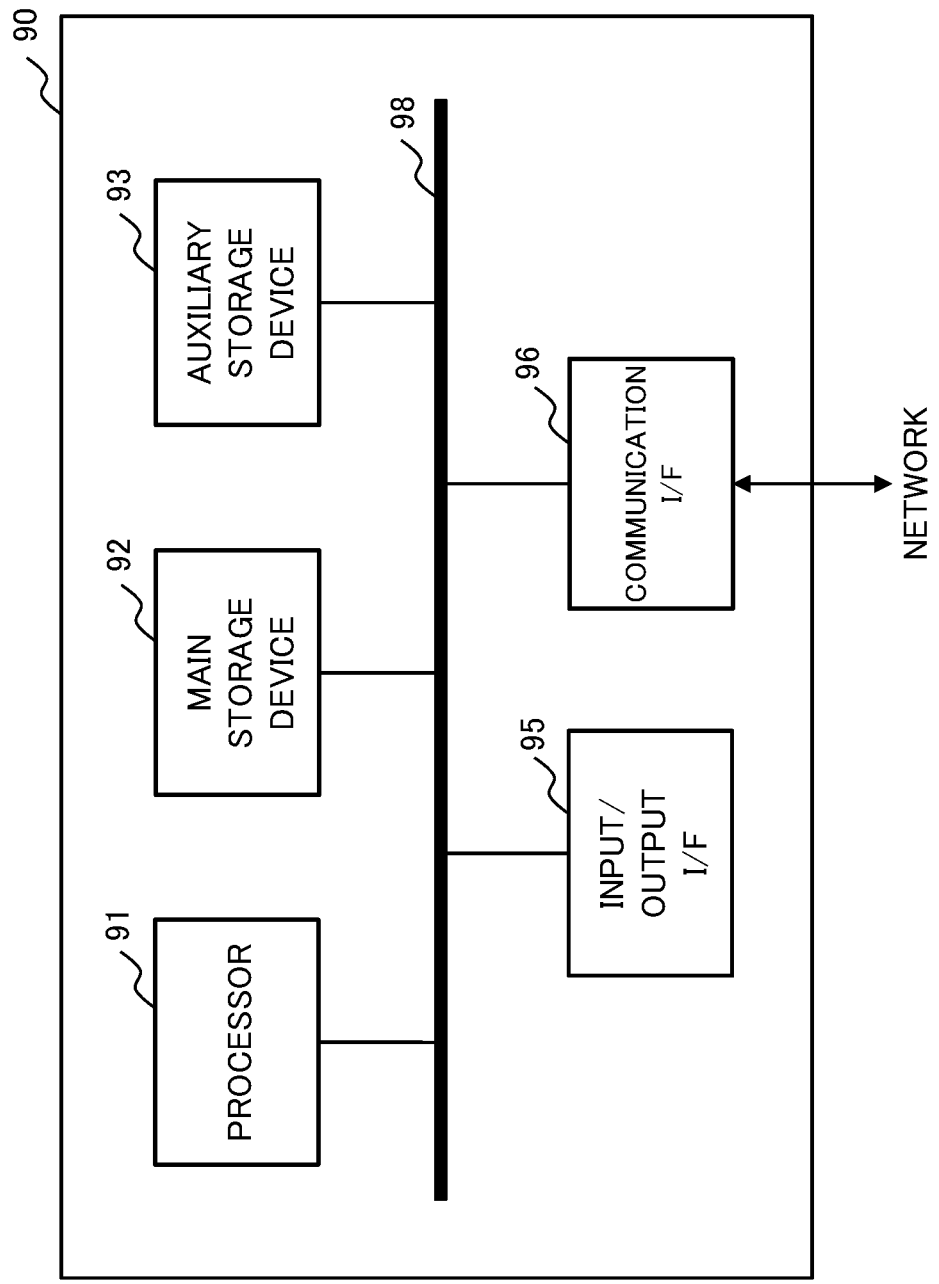
FIG. 16 is a block diagram illustrating an example of a hardware configuration that executes processing of each example embodiment.

As illustrated in FIG. 16, the information processing device 90 includes a processor 91, a main storage device 92, an auxiliary storage device 93, an input/output interface 95, and a communication interface 96. In FIG. 16 the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing control and processing of each example embodiment. The processor 91 executes the program developed in the main storage device 92. The processor 91 executes the program to execute control and processing according to each example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). As the main storage device 92, a nonvolatile memory such as a magnetoresistive random access memory (MRAM) may be configured/added.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. As an interface connected to an external device, the input/output interface 95 and the communication interface 96 may be shared.

An input device such as a keyboard, a mouse, or a touch panel may be connected to the information processing device 90 as necessary. These input devices are used to input of information and settings. In a case where a touch panel is used as the input device, a screen having a touch panel function serves as an interface. The processor 91 and the input device are connected via the input/output interface 95.

The information processing device 90 may be provided with a display device that displays information. In a case where a display device is provided, the information processing device 90 includes a display control device (not illustrated) that controls display of the display device. The information processing device 90 and the display device are connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of a hardware configuration for enabling control and processing according to each example embodiment of the present example disclosure. The hardware configuration of FIG. 16 is an example of a hardware configuration that executes control and processing according to each example embodiment, and does not limit the scope of the present example disclosure. A program for causing a computer to execute control and processing according to each example embodiment is also included in the scope of the present example disclosure.

A program recording medium in which the program according to each example embodiment is recorded is also included in the scope of the present example disclosure. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium is a program recording medium.

The components of the example embodiments may be combined in any manner. The components of the example embodiments may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A training device comprising:
a memory storing instructions; and
a processor connected to the memory and configured to execute the instructions to:
acquire first motion data related to a target motion;
generate pseudo first motion data by using a first generation model that outputs the pseudo first motion data in response to an input of the first motion data;
calculate a determination loss indicating a degree of deviation between the first motion data and the pseudo first motion data with respect to the acquired first motion data and the generated pseudo first motion data using a determination model for determining whether input motion data is the first motion data or the pseudo first motion data;
reconfigure the target motion by a combination of at least one basis motion;
calculate a degree of relevance between the target motion and the basis motion;
calculate a regularization loss indicating a degree of deviation between motion data related to the at least one basis motion and the pseudo first motion data; and
adversarially train the first generation model and the determination model using the determination loss and the regularization loss.

2. The training device according to claim 1, wherein the processor is configured to execute the instructions to reconfigure a combination of the basis motion by a linear combination,
calculate, as the degree of relevance, a coefficient of the linearly combined basis motion, and
calculate the regularization loss by weighted averaging distances of a predetermined probability distribution defined between motion data related to the basis motion and the pseudo first motion data with the degree of relevance as a weight.

3. The training device according to claim 1, wherein the processor is configured to execute the instructions to generate pseudo second motion data by using a second generation model that outputs the pseudo second motion data in response to an input of second motion data related to a source motion in which the target motion is reconfigurable,
reconfigure the target motion by a combination of the at least one source motion,
calculate the degree of relevance between the target motion and the source motion, and
calculate the regularization loss between the at least one pseudo second motion data and the pseudo first motion data.

4. The training device according to claim 3, wherein the processor is configured to execute the instructions to reconfigure a combination of the source motion by a linear combination,
calculate, as the degree of relevance, a coefficient of the linearly combined source motion, and
calculate the regularization loss by weighted averaging distances of a predetermined probability distribution defined between the pseudo first motion data and the pseudo second motion data with the degree of relevance as a weight.

5. The training device according to claim 1, wherein the processor is configured to execute the instructions to acquire second motion data related to a source motion,
reconfigure the target motion by a linear combination of the at least one source motion,
calculate the degree of relevance between the target motion and the source motion, and
calculate the regularization loss between the at least one second motion data and the pseudo first motion data.

6. A data extension system that extends motion data using a first generation model trained by the training device according to claim 1, the data extension system comprising:
a memory storing instructions; and
a processor connected to the memory and configured to execute the instructions to:
acquire time series skeleton data measured according to a motion of a person;
separate, from the time series skeleton data, physique data related to an attribute element of the person, timing data related to a time element of a motion performed by the person, and motion data related to a change in posture during a motion performed by the person;
extend the motion data using the first generation model;
extend each of the physique data and the timing data;
extend the time series skeleton data by integrating the extended physique data, the extended timing data, and the extended motion data; and
output the extended time series skeleton data.

7. The data extension system according to claim 6, wherein
the processor is configured to execute the instructions to
separate the physique data from the time series skeleton data,
separate the timing data from the time series skeleton data from which the physique data is separated,
change the attribute element to extend the physique data,
change the time element to extend the timing data, extend the motion data by generating pseudo motion data output from the first generation model in response to an input of the motion data, and integrate the extended physique data, the extended timing data, and the extended motion data to extend the time series skeleton data.

8. An estimation device that estimates a motion of a person using an estimation model trained using time series skeleton data extended by the data extension system according to claim 7, the estimation device comprising:

a memory storing instructions; and a processor connected to the memory and configured to execute the instructions to:

acquire actual data measured according to a motion of a person;

estimate, as a motion of the person, estimation data output from the first generation model in response to an input of the actual data; and output the estimated estimation data.

9. A training method executed by a computer, the method comprising:

acquiring first motion data related to a target motion;

generating a pseudo first motion using a first generation model that outputs pseudo first motion data in response to an input of the first motion data;

calculating a determination loss using a determination model outputting a determination loss indicating a degree of deviation between the first motion data and the pseudo first motion data with respect to the acquired first motion data and the generated pseudo first motion data using a determination model for determining whether input motion data is the first motion data or the pseudo first motion data;

reconfiguring the target motion by a combination of at least one basis motion;

calculating a degree of relevance between the target motion and the basis motion;

calculating a regularization loss indicating a degree of deviation between motion data related to the at least one basis motion and the pseudo first motion data; and adversarially training the first generation model and the determination model using the determination loss and the regularization loss.

10. A non-transitory recording medium storing a program for causing a computer to execute:

acquiring first motion data related to a target motion;

generating a pseudo first motion using a first generation model that outputs pseudo first motion data in response to an input of the first motion data;

calculating a determination loss using a determination model outputting a determination loss indicating a degree of deviation between the first motion data and the pseudo first motion data with respect to the acquired first motion data and the generated pseudo first motion data using a determination model for determining whether input motion data is the first motion data or the pseudo first motion data;

reconfiguring the target motion by a combination of at least one basis motion;

calculating a degree of relevance between the target motion and the basis motion;

calculating a regularization loss indicating a degree of deviation between motion data related to the at least one basis motion and the pseudo first motion data; and adversarially training the first generation model and the determination model using the determination loss and the regularization loss.

* * * * *